United States Patent
Zhang et al.

(10) Patent No.: US 10,708,013 B2
(45) Date of Patent: Jul. 7, 2020

(54) SYSTEMS AND METHODS FOR UPLINK DMRS ENHANCEMENT IN FD-MIMO

(71) Applicant: INTEL CORPORATION, Santa Clara, CA (US)

(72) Inventors: Yushu Zhang, Beijing (CN); Yuan Y. Zhu, Beijing (CN); Wenting Chang, Beijing (CN); Xiogang C. Chen, Portland, OR (US); Qinghua Li, San Ramon, CA (US)

(*) Notice: Subject to any disclaimer, the term of this patent is extended or adjusted under 35 U.S.C. 154(b) by 0 days.

(21) Appl. No.: 16/067,680

(22) PCT Filed: Mar. 30, 2016

(86) PCT No.: PCT/US2016/024876
§ 371 (c)(1),
(2) Date: Jul. 2, 2018

(87) PCT Pub. No.: WO2017/171742
PCT Pub. Date: Oct. 5, 2017

(65) Prior Publication Data
US 2019/0020451 A1   Jan. 17, 2019

(51) Int. Cl.
*H04L 5/00* (2006.01)
*H04B 7/0452* (2017.01)
(Continued)

(52) U.S. Cl.
CPC ......... *H04L 5/0037* (2013.01); *H04B 7/0452* (2013.01); *H04L 5/0023* (2013.01);
(Continued)

(58) Field of Classification Search
CPC .................................................... H04L 5/0037
(Continued)

(56) References Cited

U.S. PATENT DOCUMENTS

2009/0110038 A1\* 4/2009 Montojo ................. H04L 1/003
375/211
2010/0296465 A1   11/2010 Hooli et al.
(Continued)

FOREIGN PATENT DOCUMENTS

WO   2014114113 A1   7/2014

OTHER PUBLICATIONS

3GPP TS 36.211, "3rd Generation Partnership Project; Technical Specification Group Radio Access Network; Evolved Universal Terrestrial Radio Access (E-UTRA); Physical Channels and Modulation (Release 8)", V8.9.0, Dec. 2009, 83 pages.
(Continued)

*Primary Examiner* — Lihong Yu
(74) *Attorney, Agent, or Firm* — Stoel Rives LLP

(57) ABSTRACT

The present disclosure includes systems and methods for reducing intra-cell interference during uplink MU-MIMO. An uplink grant that allocates a plurality of resource blocks is obtained. A first portion of the plurality of RBs that are overlapping with a set of RBs granted to a second UE is determined. A second portion of the plurality of RBs that are non-overlapping with the set of RBs granted to the second UE is also determined. A first demodulation reference signal (DMRS) sequence is generated for the first portion of the plurality of RBs. A second DMRS sequence is generated for the second portion of the plurality of RBs, where the second DMRS sequence is different than the first DMRS sequence. An uplink transmission (e.g., PUCCH, PUSCH) is generated that includes RBs having different DMRS sequences.

16 Claims, 13 Drawing Sheets

(51) Int. Cl.
*H04L 27/26* (2006.01)
*H04J 13/00* (2011.01)
*H04J 11/00* (2006.01)

(52) U.S. Cl.
CPC .......... *H04L 5/0051* (2013.01); *H04L 5/0062* (2013.01); *H04L 27/261* (2013.01); *H04L 27/2613* (2013.01); *H04J 11/0036* (2013.01); *H04J 13/0062* (2013.01)

(58) Field of Classification Search
USPC ........................................................ 375/262
See application file for complete search history.

(56) References Cited

U.S. PATENT DOCUMENTS

| 2011/0286406 A1* | 11/2011 | Chen | H04L 1/1861 370/329 |
| 2013/0064227 A1 | 3/2013 | Iwai et al. | |
| 2013/0114756 A1* | 5/2013 | Jia | H04J 11/00 375/295 |
| 2014/0036850 A1* | 2/2014 | Akimoto | H04L 5/0017 370/329 |
| 2014/0192756 A1 | 7/2014 | Baldemair et al. | |

OTHER PUBLICATIONS

PCT/US2016/024876, International Search Report and Written Opinion, dated Nov. 29, 2016, 15 pages.

\* cited by examiner

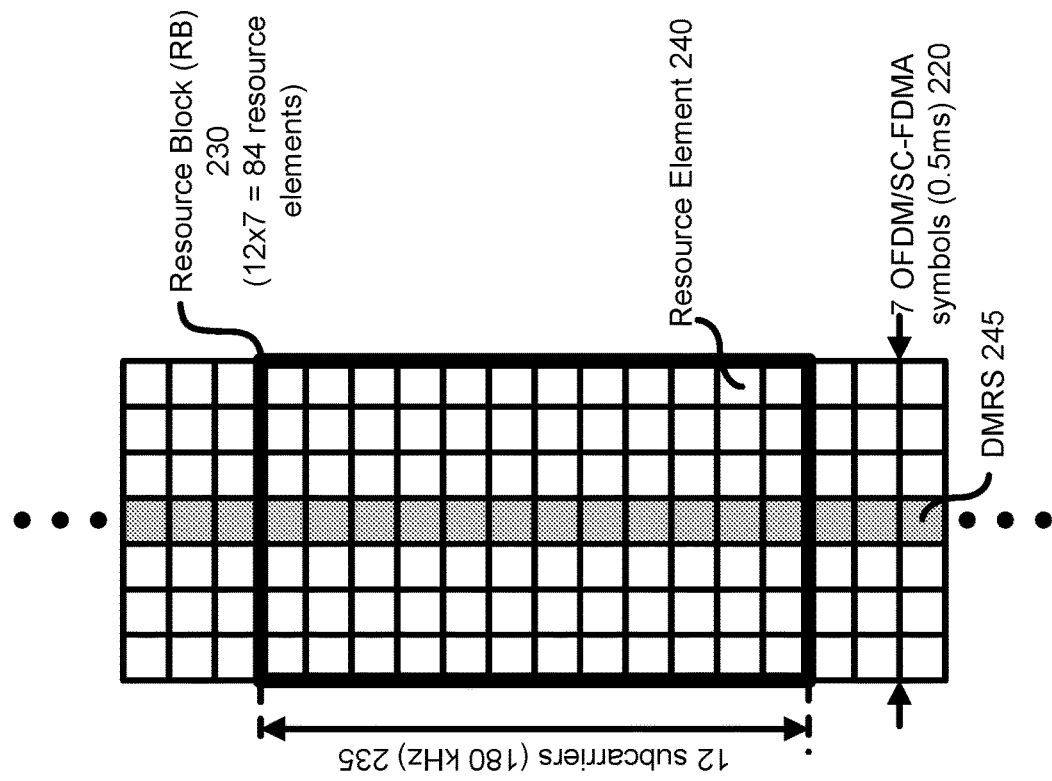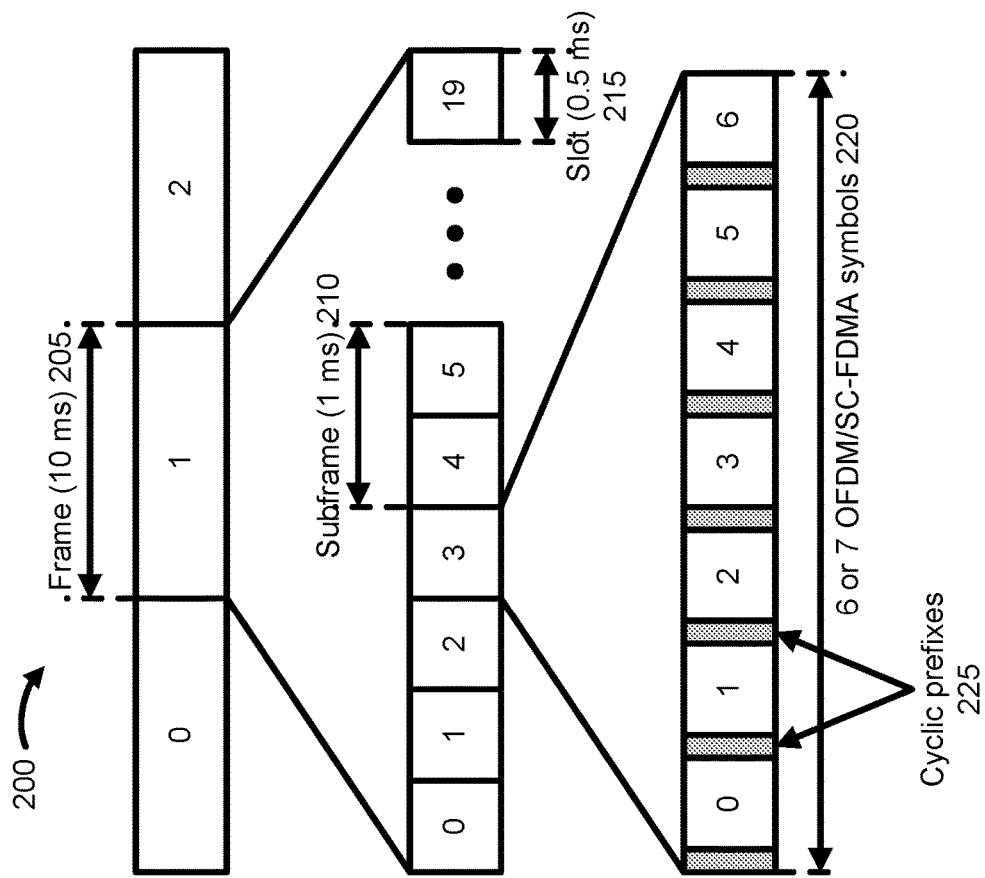
FIG. 2

US 10,708,013 B2

SYSTEMS AND METHODS FOR UPLINK DMRS ENHANCEMENT IN FD-MIMO

RELATED APPLICATIONS

This application is a national stage filing under U.S.C. § 371 of International Patent Application No. PCT/US2016/024876, filed Mar. 30, 2016, which is hereby incorporated by reference herein in its entirety.

TECHNICAL FIELD

The present disclosure relates to demodulation reference signals (DMRS). In particular the disclosure relates to the use of DMRS in uplink multi-user multiple-input multiple-output (MU-MIMO).

BRIEF DESCRIPTION OF THE DRAWINGS

FIG. 2 is a schematic diagram illustrating the structure of a long term evolution (LTE) communication frame.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed for ensuring the orthogonality of demodulation reference signals (DMRS) for multi-user multiple-input multiple-output (MU-MIMO) when the size of the resource block (RB) grant varies among MU-MIMO UEs. In one example, a UE may divide a RB grant into an overlapping RB portion and a non-overlapping RB portion, where the size of the overlapping RB portion is the same as the overlapping RBs so that the root sequence used to generate the DMRS are the same for the UE (each MU-MIMO UE), resulting in orthogonal DMRS.

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In 3GPP radio access networks (RANs) in LTE systems, the base station can include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE).

A common goal in cellular wireless networks (such as 3GPP networks) includes efficient use of licensed bandwidth. One way that a UE, or other mobile wireless devices, can more efficiently use bandwidth is through space-division multiple access (SDMA). For example, multiple-input multiple-output (MIMO) technologies can be used to multiply the capacity of a radio link by exploiting multipath propagation. In another example, multi-user MIMO (MU-MIMO) technologies can be used to transmit/receive to multiple users at the same time and on the same frequency resources by using different spatial signatures.

Figure 1:
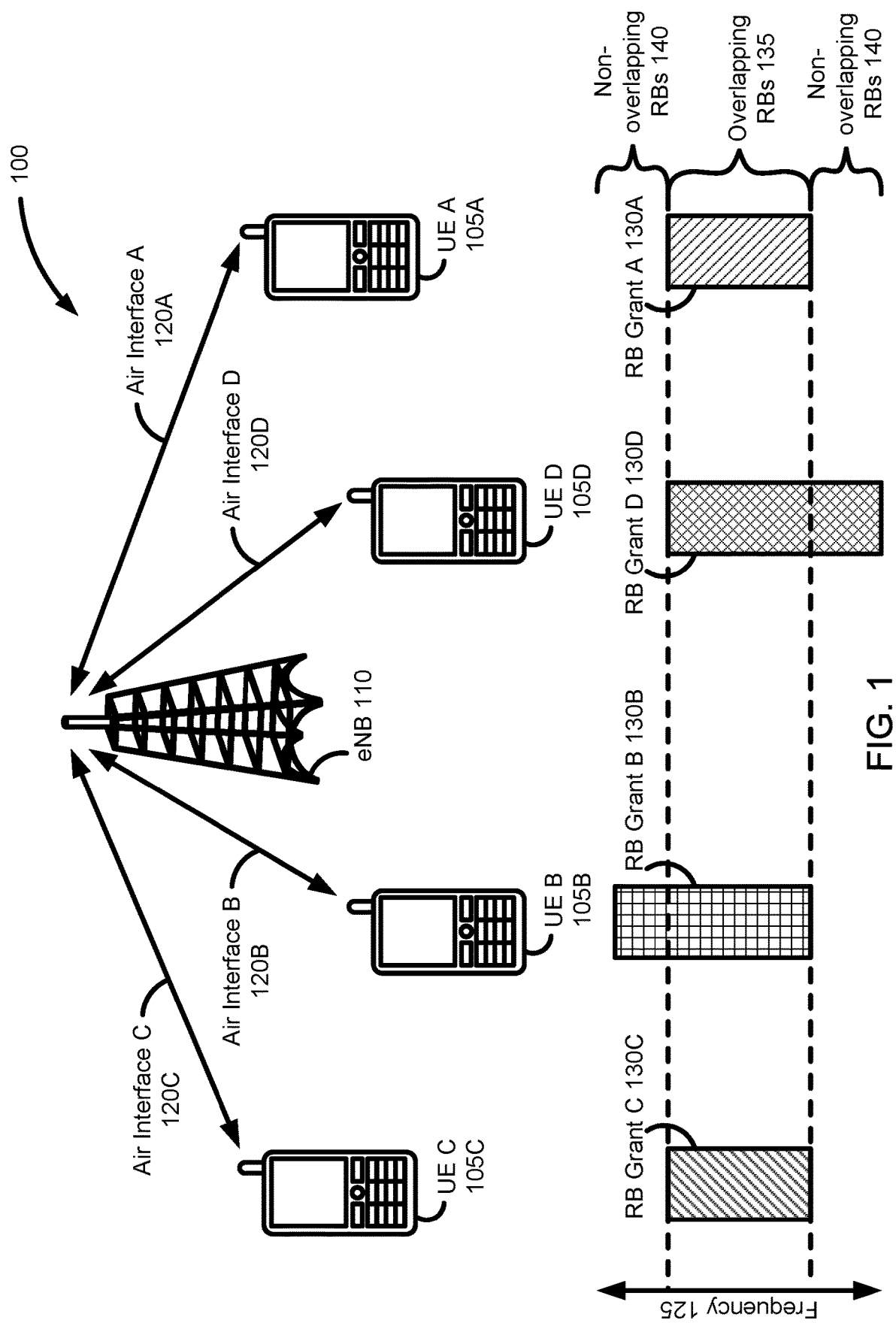
FIG. 1 illustrates an example of an environment in which the present systems and methods may be implemented.

Turning now to the Figures, FIG. 1 illustrates an example of an environment 100 in which the present systems and methods may be implemented. The environment 100 includes a portion of a radio access network (RAN) system that includes a cellular air interface 120A-D (such as an LTE/LTE-Advanced access link) being provided between the eNB 110 and each UE 105A-D.

Each UE 105A-D may be granted time/frequency resources (e.g., RBs) from the eNB 110. For example, UE A 105A is granted RB Grant A 130A, UE B 105B is granted RB Grant B 130B, UE C 105C is granted RB Grant C 130C, and UE D 105D is granted RB Grant D 130D. In the case of MU-MIMO, multiple UEs may be granted overlapping RBs 135. For example, FIG. 1 illustrates one example of four user MU-MIMO, where UE A 105A and UE C 105C are granted the same RBs (e.g., RB Grant A 130A, RB Grant C 130C are the same size and have the same starting subcarrier) while UE B 105B and UE D 105D are each granted different RBs. For instance, RB Grant B 130B has the same starting subcarrier as RB Grants A,C 130A,C but is bigger in size than RB Grants A,C 130A,C. Therefore, only a portion of RB Grant B 130B includes the overlapping RBs 135. RB Grant D 130D on the other hand has a different starting subcarrier than RB Grants A-C 130A-C and is bigger in size than RB Grants A,C 130A,C, similar to RB Grant B 130B. Therefore, RB Grant D 130D occupies different RBs than RB Grant B 130B and only a portion of RB Grant D 130D includes the overlapping RBs 135. As illustrated in FIG. 1, RB Grants A,C 130A,C occupy the overlapping RBs 135 while only a portion of each of RB Grants B,D 130B,D occupy the overlapping RBs 135. In the overlapping RBs 135, the MU-MIMO operation may be applied.

With the help of a large number of active antenna elements and multiple receiving digital antenna ports, the MU-MIMO dimension may be increased. For example, uplink Full Dimension MIMO (FD-MIMO) may be realized. In some examples, FD-MIMO enables MU-MIMO transmission to large number of UEs 105 (e.g., more than 10 UEs 105).

FIG. 2 is a schematic diagram 200 illustrating the structure of a long term evolution (LTE) communication frame 205. A frame 205 has a duration of 10 milliseconds (ms). The frame 205 includes ten subframes 210, each having a duration of 1 ms. Each subframe 210 includes two slots 215, each having a duration of 0.5 ms. Therefore, the frame 205 includes 20 slots 215.

Each slot 215 includes six or seven symbols 220 (e.g., orthogonal frequency-division multiplexing (OFDM) symbols, single-carrier frequency-division multiple access (SC-FDMA) symbols). The number of symbols 220 in each slot 215 is based on the size of the cyclic prefixes (CP) 225. For example, the number of symbols 220 in the slot 215 is seven while in normal mode CP and six in extended mode CP.

The smallest allocable unit for transmission is a resource block 230 (i.e., physical resource block (PRB)). Transmissions are scheduled by RB 230. A RB 230 consists of 12 consecutive subcarriers 235, or 180 kHz, for the duration of one slot 215 (0.5 ms). A resource element 240, which is the smallest defined unit, consists of one OFDM/SC-FDMA subcarrier during one OFDM/SC-FDMA symbol interval. In the case of normal mode CP, each RB 230 consists of 12×7=84 resource elements 240 (72 resource elements 240 in the case of extended mode CP). The eNB 110 may allocate one or more RBs 230 for communication. For example, the eNB 110 may allocate one or more RBs 230 to a UE for uplink communication in an uplink grant. As used herein, an RB grant is the RBs 230 allocated to the UE for uplink communication.

In LTE systems, reference signals are used for various purposes. Often reference signals are used by the receiving device to estimate channel conditions. Examples of uplink reference signals include demodulation reference signals (DMRS, DRS, or DM-RS) 245 and sounding reference signals (SRS). DMRS and SRS are used within the physical (PHY) layer and do not convey information from higher layers. The present systems and methods relate to DMRS.

DMRS 245 are associated with and facilitate the coherent demodulation of the physical uplink control channel (PUCCH) and/or the physical uplink shared channel (PUSCH). DMRS 245 are transmitted in the fourth single-carrier frequency-division multiple access (SC-FDMA) symbol of a slot 215. For example, the DMRS sequence is mapped to the RBs allocated to the PUSCH in symbol 3 (i.e., the fourth SC-FDMA symbol) in each slot 215 for normal cyclic prefix (CP) and symbol 2 (not shown) (i.e., the third SC-FDMA symbol) in each slot 215 for extended CP. The DMRS 245 may be the same size as the assigned resource (e.g., resource element 240).

DMRS 245 are user-specific reference signals. Therefore, in order to support a large number of UEs (in multiple cells, for example), a large number of different DMRS sequences are needed. In the present LTE specification, DMRS sequences can be generated using equation (1).

$$r^\tau(m \times M_{SC}^{PUSCH} + n) = w^\tau(m) r_{u,v}^{\alpha_\tau}(n) \qquad (1)$$

Where $w^\tau(m)$ denotes the orthogonal cover code (OCC); $r_{u,v}^{\alpha_\tau}(n) = e^{j\alpha_\tau n} \bar{r}_{u,v}(n)$ and $\bar{r}_{u,v}(n)$ indicates the Zadoff-Chu sequence defined in clause 5.5.1 of 3GPP TS 36.211 version 12.8.0 Release 12; and $M_{SC}^{PUSCH}$ refers to the number of subcarriers per symbol for PUSCH.

Therefore, DMRS 245 may be generated based on the Zadoff-Chu sequence. Zadoff-Chu sequences are constant amplitude zero autocorrelation (CAZAC) sequences. Accordingly, different DMRS sequences may be generated by applying different cyclic shifts (e.g., different values of α in $e^{j\alpha_\tau n}$) to the root Zadoff-Chu sequence (i.e., $\bar{r}_{u,v}(n)$).

However, the root sequence $\bar{r}_{u,v}(n)$ is dependent on the size of the reference signal sequence and the reference signal sequence is based on the number of RBs 230 (i.e., number of subcarriers per symbol) in the grant. For example, as defined in clause 5.5.1 of 3GPP TS 36.211 version 12.8.0, $r_{u,v}^{\alpha}(n) = e^{j\alpha n} \bar{r}_{u,v}(n)$, for $0 \le n \le M_{SC}^{RS}$ where $M_{SC}^{RS} = m N_{SC}^{RB}$ is the length of the reference signal sequence. Therefore, the root sequence $\bar{r}_{u,v}(n)$ of two RB grants will be the same if the RB grants are the same size, but the root sequence $\bar{r}_{u,v}(n)$ of the two grants will be different if the RB grants are not the same size. Since the root sequences $\bar{r}_{u,v}(n)$ of different sized RB grants are different, the DMRS generated by the different root sequences will be different and may be non-orthogonal. Non-orthogonal DMRS may cause intra-cell interference between MU-MIMO UEs.

Therefore, based on equation (1), UE A 105A and UE C 105C, which have the same RB Grant (i.e., RB Grant A 130A is for the same RBs as RB Grant C 130C), may have DMRS sequences that are orthogonal. However, the DMRS sequence for UE B 105B and UE D 105D may be non-orthogonal because RB Grant D 105D has a different starting subcarrier than RB Grants A-C 130A-C and/or RB Grant B 105B has a different ending subcarrier than RB Grants A,C,D 130A,C,D. Therefore, the root sequences for UE B 105B and UE D 105D may be different than the root sequence for UE A,C 105A,C. This non-orthogonality of DMRS sequences may have some impact on the decoding performance.

The described systems and methods propose DMRS enhancements to reduce the mutual interference for MU-MIMO users due to non-orthogonal DMRS sequences. DMRS enhancements include DMRS sequence generation enhancements, DMRS resource mapping enhancements, and DMRS control signaling enhancements.

Figure 3:
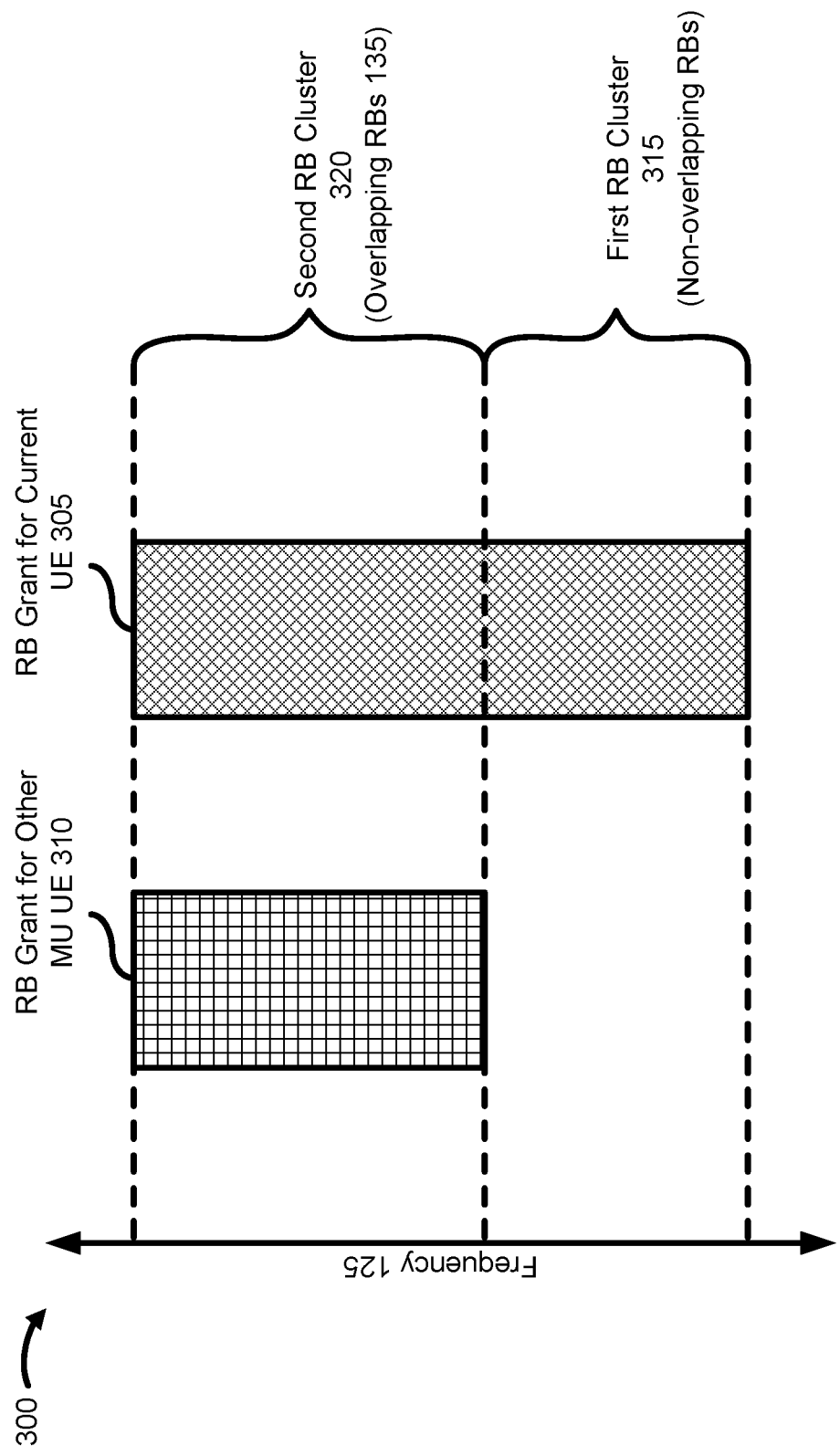
FIG. 3 illustrates one example of cluster division for DMRS sequence generation when different UEs have different RB Grants.

FIG. 3 illustrates one example 300 of cluster division for DMRS sequence generation when different UEs have different RB Grants (i.e., the RB Grant for the current UE 305 has a different starting point than the RB Grant for another MU-MIMO UE 310). As mentioned previously, the root sequence $\bar{r}_{u,v}(n)$ may not be the same in the overlapped RBs (e.g., overlapping RBs 135) if the MU-MIMO UEs 105 are granted RBs with different starting points (different sized RB grants, same sized RB grants having different starting points, for example).

In one embodiment, the scheduled RBs for one UE may be divided into two RB clusters, where one RB cluster denotes the RBs ahead of (i.e., outside of) the overlapped RBs (e.g., overlapping RBs 135) and the other RB cluster denotes the overlapping RBs (e.g., overlapping RBs 135). For example, the RB grant for the current UE 305 is divided into two RB clusters (e.g., first RB cluster 315 and second RB cluster 320), where the second RB cluster 320 includes the overlapping RBs (e.g., overlapping RBs 135) beginning with the starting index of the first overlapping RB (e.g., the starting index of the RB Grant for other MU UE 310) and the first RB cluster 315 includes the RBs prior to the overlapping RBs beginning with the starting index of the first RB in the RB Grant for the current UE 305.

Dividing the scheduled RBs into two clusters (i.e., overlapping RBs 135 and non-overlapping RBs 140), enables two root sequences $\bar{r}_{u,v}(n)$ to be generated. One root sequence $\bar{r}_{u,v}(n)$ for the non-overlapping RBs 140 and one root sequence $\bar{r}_{u,v}(n)$ for the overlapping RBs 135. Since the overlapping RBs 135, would be the same size as the RBs from other UEs used for MU-MIMO, the root sequences $\bar{r}_{u,v}(n)$ for that set of overlapping RBs 135 would be the same. Therefore, the DMRS generated based on those same root sequence $\bar{r}_{u,v}(n)$ would be orthogonal, eliminating the interference caused by non-orthogonal DMRS transmissions.

In one embodiment, the UE may generate a DMRS sequence for each cluster based on the pattern set forth in equations (2) and (3).

$$r^{\tau,1}(m \times M_{SC}^{PUSCH,1}+n)=w^{\tau}(m)r_{u,v}^{\alpha_\tau}(n) \quad (2)$$

$$r^{\tau,2}(m \times M_{SC}^{PUSCH,2}+n)=w^{\tau}(m)r_{u,v}^{\alpha_\tau}(n) \quad (3)$$

Where $M_{SC}^{PUSCH,1}$ indicates the number of subcarriers per symbol of the first RB cluster 315 and $M_{SC}^{PUSCH,2}$ indicates the number of subcarriers per symbol of the second RB cluster 320. In this example, the UE may generate two kinds (i.e., sets) of DMRS sequences using equation (2) for the first kind of DMRS sequence and using equation (3) for the second kind of DMRS sequence. That is, the first sequence $r^{\tau,1}(n)$ can be mapped to the first RB cluster 315 and the second sequence $r^{\tau,2}(n)$ can be mapped to the second RB cluster 320.

Figure 4:
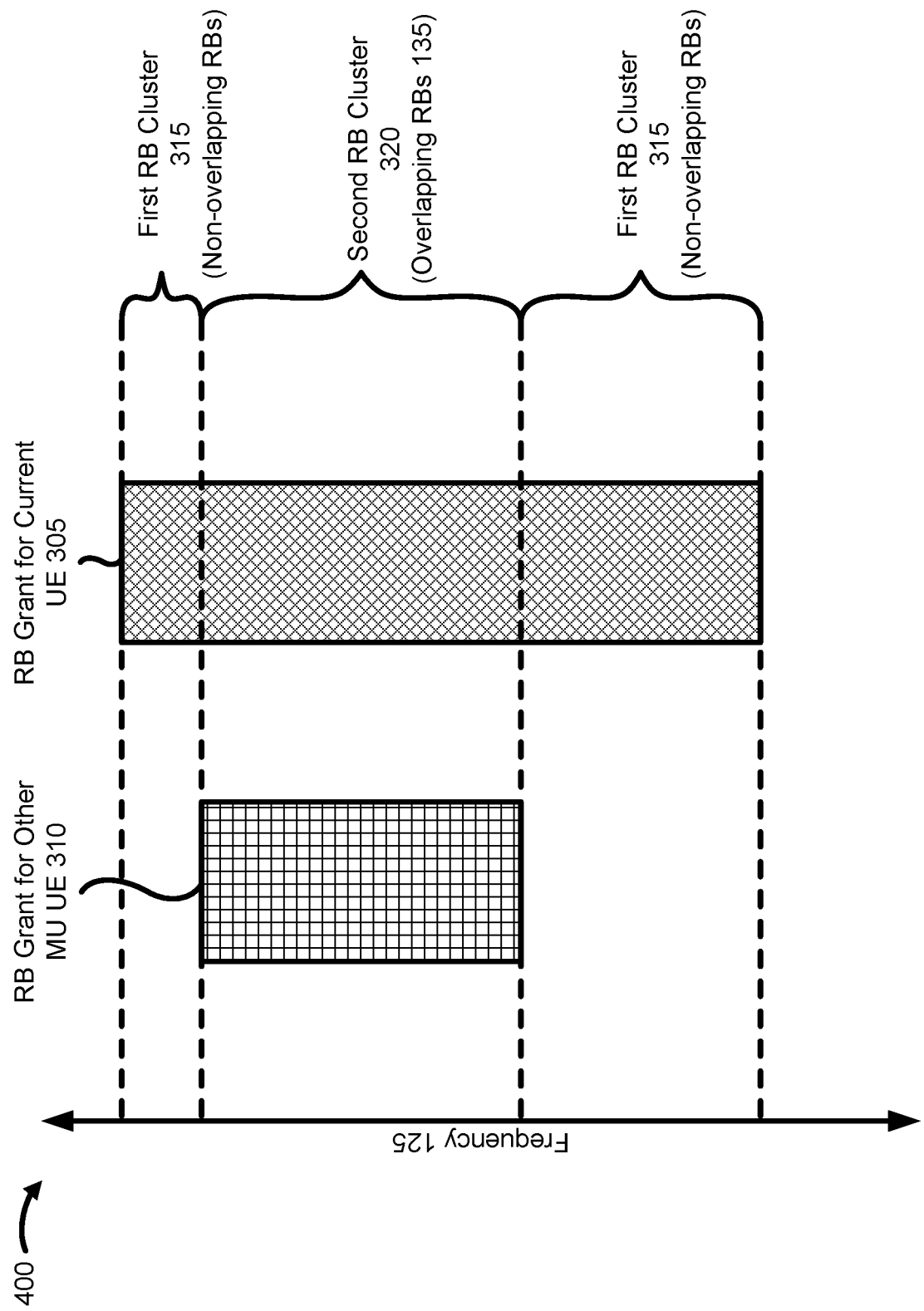
FIG. 4 illustrates another example of cluster division for DMRS sequence generation when different UEs have different RB Grants.

FIG. 4 illustrates another example 400 of cluster division for DMRS sequence generation when different UEs have different RB Grants. In one example, the RB Grant for the current UE 305 has a different starting point and a different ending point than the RB Grant for another MU-MIMO UE 310 (i.e., the RB). As mentioned previously, the root sequence $\bar{r}_{u,v}(n)$ may not be the same for the different RB grants when the different RB grants are not identical (i.e., have different starting points, different ending points, different sizes, etc.). As a result, the DMRS sequence for different UEs may be non-orthogonal which creates intra-cell interference for the MU-MIMO UEs 105 using the overlapped RBs (e.g., overlapping RBs 135).

In one embodiment, the scheduled RBs for a UE (e.g., each UE) may be divided into two RB clusters, where the first RB cluster 315 denotes the RBs outside of the overlapping RBs 135 and the second RB cluster 320 denotes the overlapping RBs 135. For example, the first RB cluster 315 includes all the RBs outside of the overlapping RBs 135 (any RBs prior to the overlapping RBs 135 and any RBs after the overlapping RBs, for example) while the second RB cluster 320 includes all of the overlapping RBs 135.

In some embodiments, it may be necessary to notify the UE 105 of the RB(s) cluster division. In some cases, the eNB 110 may notify the UE 105 of the RB cluster division via downlink control signaling. For example, the eNB 110 may notify the UE 105 of the RB cluster division in downlink control information (DCI). In one example, the resource allocation type for DCI format 4 may indicate, based on the value of the resource allocation type, whether cluster division is enabled (i.e., could have been granted). For example, a resource allocation type 1 indicates that two or more DMRS sequences may be enabled and the resource allocation type 0 indicates that only a single DMRS sequence is enabled. Therefore, a single set of DMRS sequences may be used for PUCCH/PUSCH transmission when resource allocation type 0 is indicated and two or more sets of DMRS sequences may be used for PUCCH/PUSCH transmission when resource allocation type 1 is indicated.

Additionally or alternatively, an indicator may be added to the DCI to show whether the dual DMRS sequence can be enabled. For example, a value 0 may indicate one DMRS can be used and a value 1 may indicate that two or more DMRS sequences can be utilized. In some cases, each DMRS sequence is one-to-one mapped to a RB cluster. Alternatively, when scheduled with two RB clusters, the two DMRS sequences can be used for each RB cluster (as illustrated below in FIG. 5). In an alternative embodiment, the one bit indicator may be configured by higher layer signaling (via radio resource control (RRC) signaling, for example).

Figure 5:
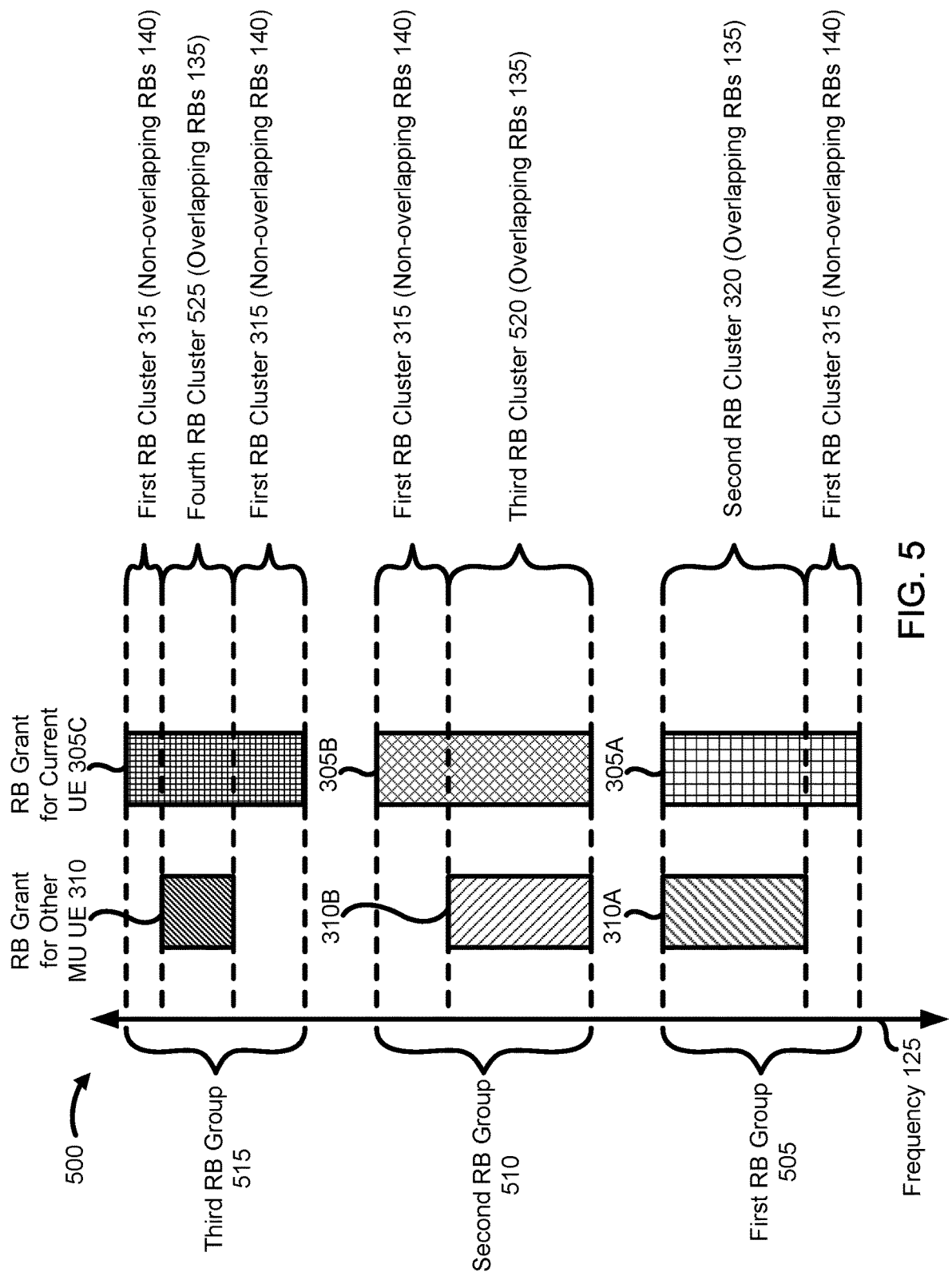
FIG. 5 illustrates an example of cluster division for DMRS sequence generation for when a UE is granted multiple RB groups.

FIG. 5 illustrates an example 500 of cluster division for DMRS sequence generation for when a UE is granted multiple RB groups. In some cases, a UE may be scheduled with discontinuous RBs. For example, a UE may be scheduled with discontinuous RBs (i.e., multiple RB groups) if an OFDM waveform is used for uplink transmission. In some cases, an indicator may be added to the DCI to show the starting RB or RB group (RBG) index for the second/other RB(s) cluster. In one example, an invalid value of this indicator may indicate the second RB(s) cluster is disabled. For instance, the invalid value may be 0. If two or more DMRS sequences are applied, then (if enabled) a DMRS cluster can be applied to each RB cluster (i.e., an independent DMRS sequence for each RB group).

In one example, a UE may be scheduled to use a grant of three RB groups, RB grant 305A as the first RB group 505, RB grant 305B as the second RB group 510, and RB grant 305C as the third RB group 515. The UE may be configured for MU-MIMO over at least a portion of each RB group. For example, another MU-MIMO UE may have RB grant 310A in the first RB group 505, RB grant 310B in the second RB group 510, and RB grant 310C in the third RB group 515. As discussed previously, on a RB grant may be divided into two clusters to ensure orthogonality of DMRS used in MU-MIMO for overlapping RBs 135. In the case of multiple RB groups, the dividing/clustering may be group specific. Additionally, each group may use an independent DMRS sequence (i.e., generate DMRS based on different root sequences).

For example, the first RB group 505 is divided into two clusters, a first RB cluster 315 for the non-overlapping RBs 140 in the first RB group 505 and a second RB cluster 320 for the overlapping RBs 135 in the first RB group 505. The second RB group 510 is also divided into two clusters, a third RB cluster 520 for the overlapping RBs 135 in the second RB group 510 and the first RB cluster 315 for the non-overlapping RBs 140 in the second RB group 510. The third RB group 515 is also divided into two clusters, a fourth RB cluster 525 for the overlapping RBs 135 in the third RB group 515 and two first RB clusters 315 for the non-overlapping RBs 140 in the third RB group 515.

The third RB cluster 520 may use a DMRS sequence that is independent from the DMRS sequence that is used in the second RB cluster 320. For example, the third RB cluster 520 may use a DMRS sequence generated based on a different OCC from the OCC used in the second RB cluster 320. Similarly, the fourth RB cluster 525 may use a DMRS sequence that is independent from the DMRS sequences that are used in the second RB cluster 320 and third RB cluster 520. For example, the fourth RB cluster 525 may use a DMRS sequence generated based on a different OCC from the OCC used in the second RB cluster 320 and the third RB cluster 520. In this way, the DMRS sequence of the overlapping RBs 135 is independent of the DMRS sequence of the non-overlapping RBs 140. Additionally, the DMRS sequence of one RB group is independent of the DMRS sequence of a different RB group. That is, each UE may generate an independent DMRS sequence for each RB group (e.g., RB groups 505, 510, 515). More specifically, each UE may generate an independent DMRS sequence for each cluster of overlapping RBs 135 in each RB group.

In another embodiment (in the 3GPP 5G system, for example), the uplink RB may be scheduled in RB groups (RBGs). One RBG may contain KRBs. In one example, K can be four (that is four RBs in each RBG, for example). Here, K may be the same number as the downlink RBG number for symmetry, or may be configured through higher layer signaling (e.g., RRC signaling). In each RBG, the same DMRS sequence may be applied. Then the MU-MIMO UEs DMRS can always be orthogonal.

Figure 6:
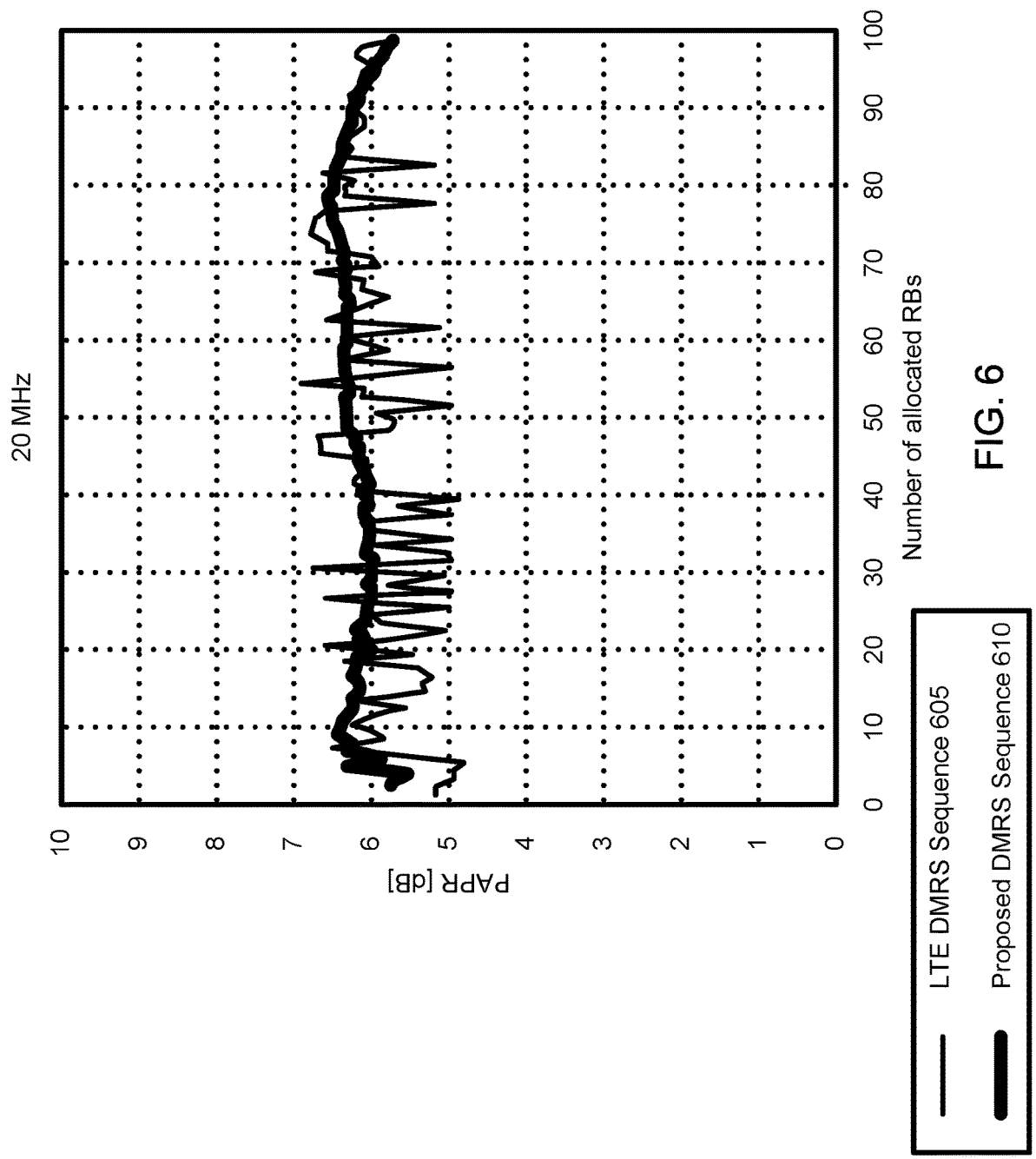
FIG. 6 illustrates one example of the result for the average Peak Average Power Ratio (PAPR) obtained by all possible RB assignments.

FIG. 6 illustrates one example 600 of the result for the average Peak Average Power Ratio (PAPR) obtained by all possible RB assignments, where the PAPR could have around 0.5 decibels (dB) difference between the proposed DMRS sequence 610 and the LTE DMRS sequence 605.

Figure 7:
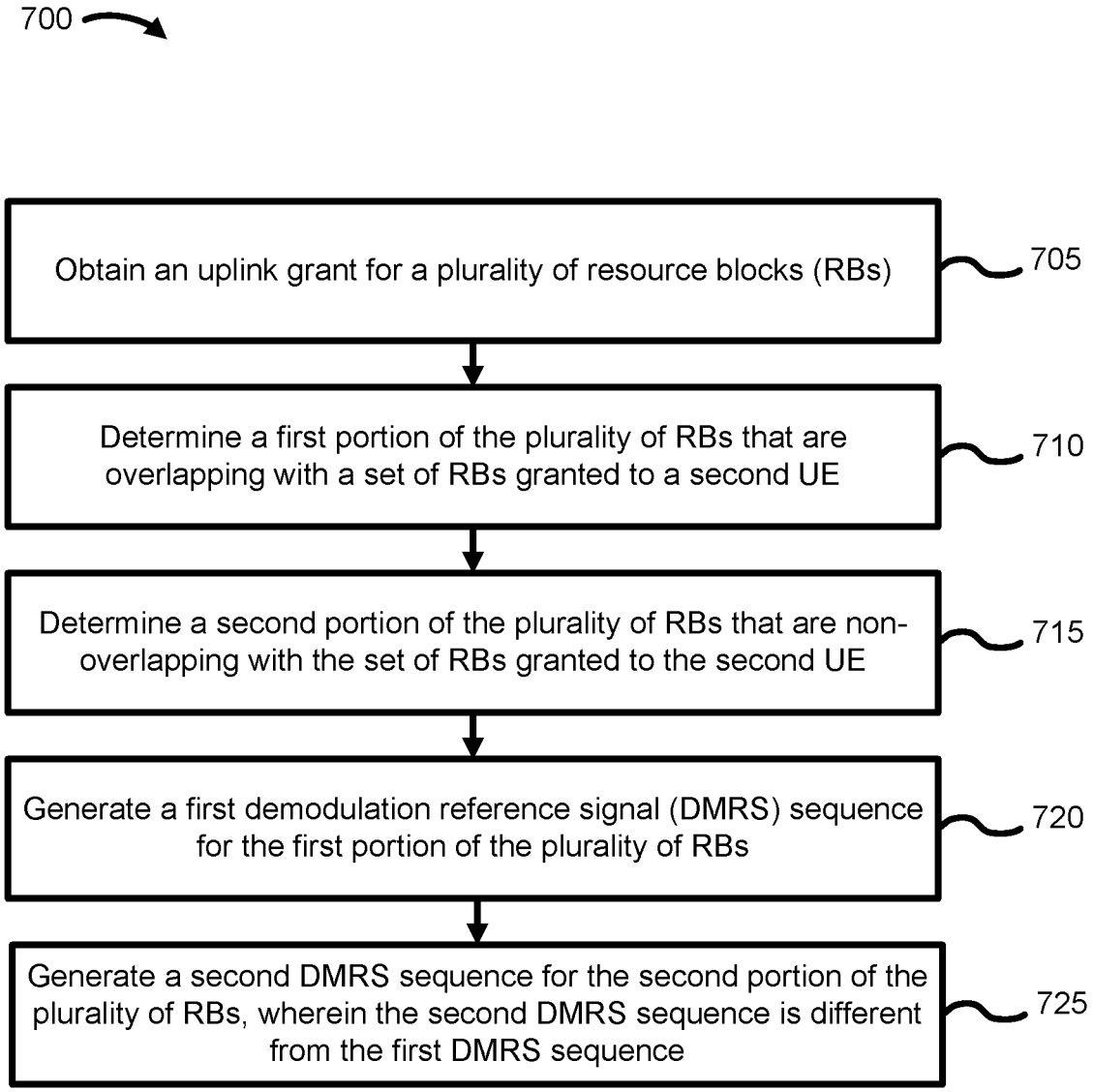
FIG. 7 is a flow diagram of a method for wireless communication by a UE that supports MU-MIMO.

FIG. 7 is a flow diagram of a method 700 for wireless communication by a UE that supports MU-MIMO. The method 700 is performed by the UE 105 illustrated in FIG. 1. Although the operations of method 700 are illustrated as being performed in a particular order, it is understood that the operations of method 700 may be reordered without departing from the scope of the method.

At 705, an uplink grant for a plurality of RBs is obtained. At 710, a first portion of the plurality of RBs that are overlapping with a set of RBs granted to a second UE is determined. At 715, a second portion of the plurality of RBs that are non-overlapping with the set of RBs granted to the second UE is determined. At 720, a first DMRS sequence is generated for the first portion of the plurality of RBs. At 725, a second DMRS sequence is generated for the second portion of the plurality of RBs. The second DMRS sequence is different from the first DMRS sequence.

The operations of method 700 may be performed by an application specific processor, programmable application specific integrated circuit (ASIC), field programmable gate array (FPGA), or the like.

Figure 8:
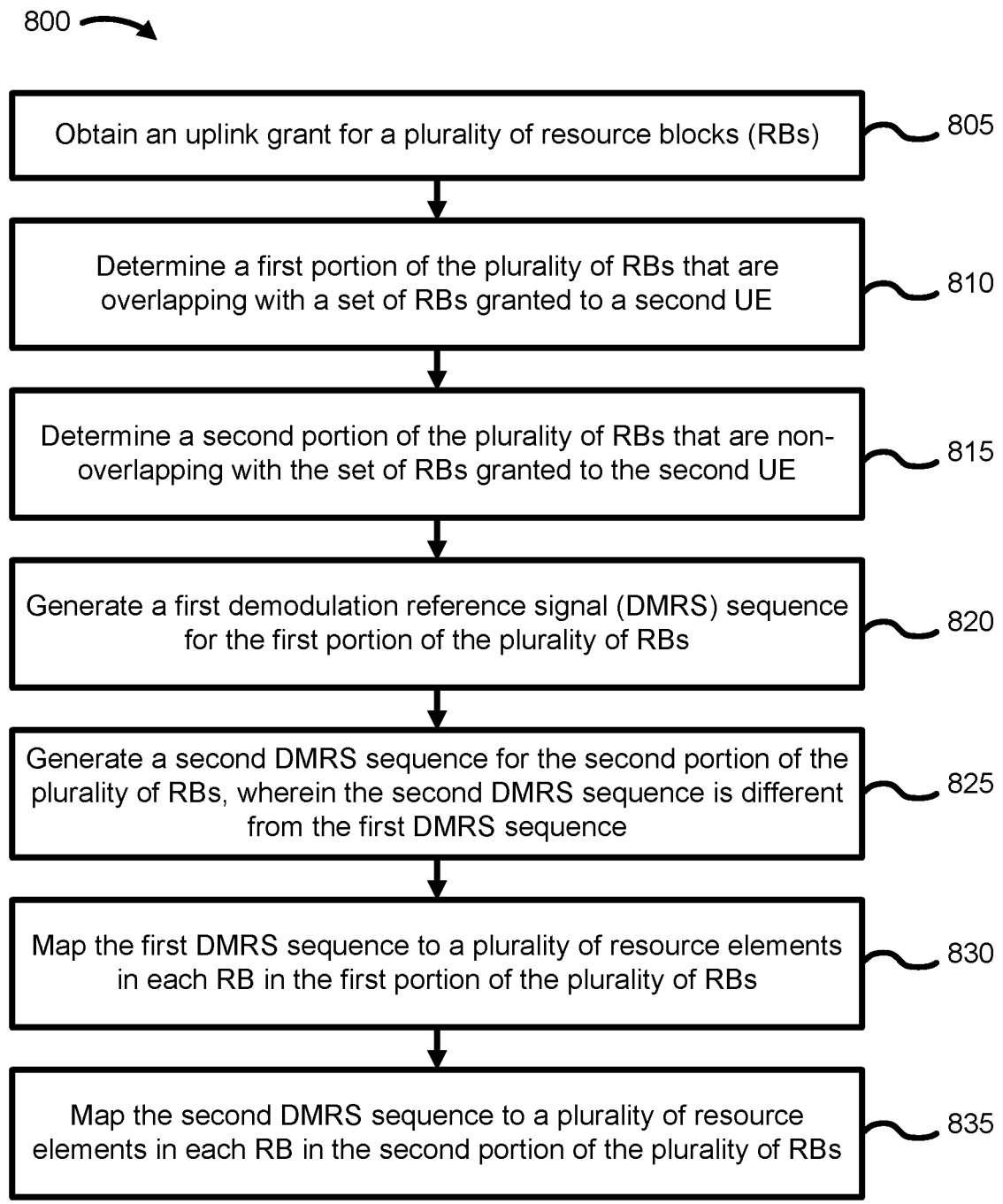
FIG. 8 is a flow diagram of a method for wireless communication by a UE that supports MU-MIMO.

FIG. 8 is a flow diagram of a method 800 for wireless communication by a UE that supports MU-MIMO. The method 800 is performed by the UE 105 illustrated in FIG. 1. Although the operations of method 800 are illustrated as being performed in a particular order, it is understood that the operations of method 800 may be reordered without departing from the scope of the method.

At 805, an uplink grant for a plurality of RBs is obtained. At 810, a first portion of the plurality of RBs that are overlapping with a set of RBs granted to a second UE is determined. At 815, a second portion of the plurality of RBs that are non-overlapping with the set of RBs granted to the second UE is determined. At 820, a first DMRS sequence is generated for the first portion of the plurality of RBs. At 825, a second DMRS sequence is generated for the second portion of the plurality of RBs. The second DMRS sequence is different from the first DMRS sequence. At 830, the first DMRS sequence is mapped to a plurality of resource elements in each RB in the first portion of the plurality of RBs. At 835, the second DMRS sequence is mapped to a plurality of resource elements in each RB in the second portion of the plurality of RBs.

The operations of method 800 may be performed by an application specific processor, programmable application specific integrated circuit (ASIC), field programmable gate array (FPGA), or the like.

Figure 9:
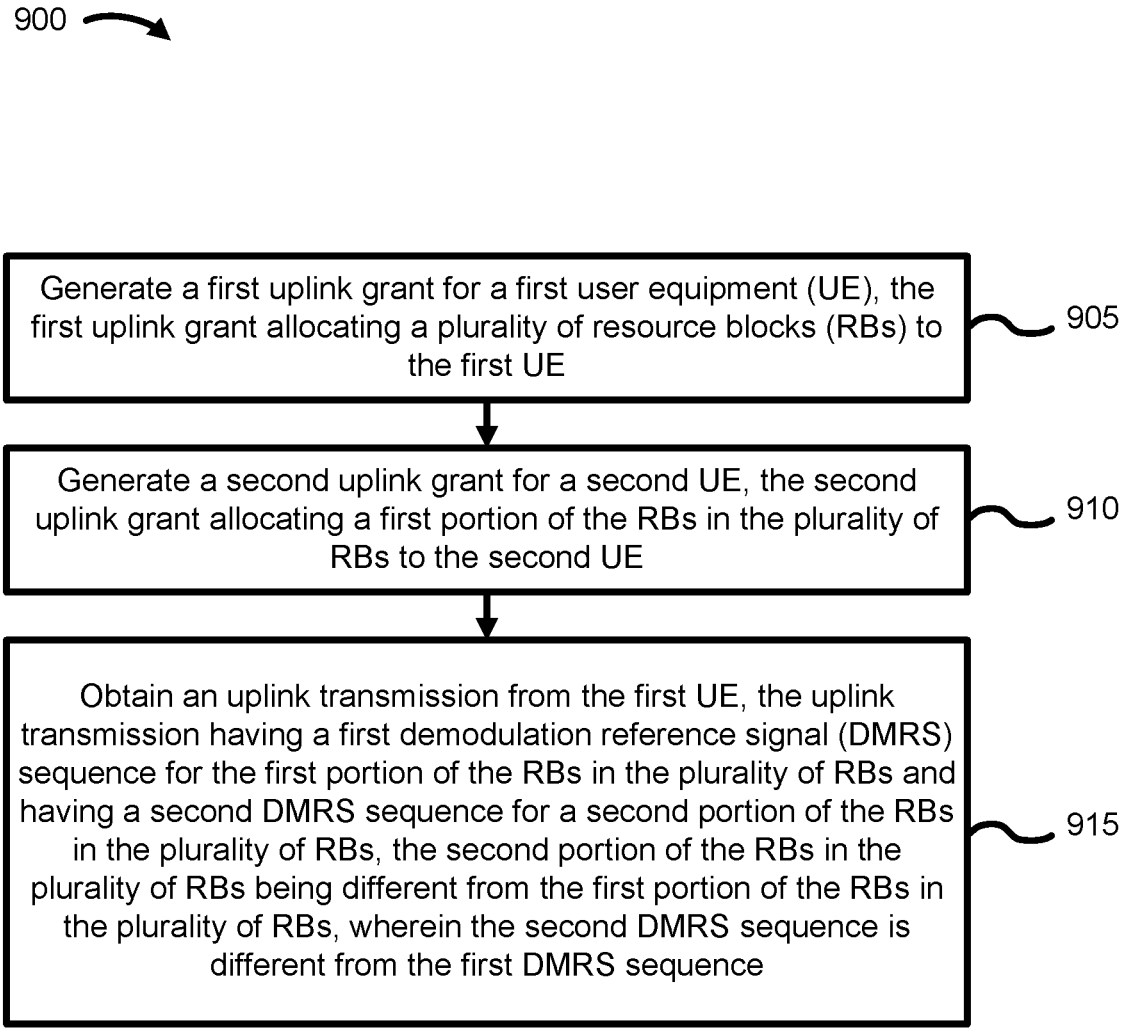
FIG. 9 is a flow diagram of a method for wireless communication by an eNB that supports MU-MIMO.

FIG. 9 is a flow diagram of a method 900 for wireless communication by an eNB that supports MU-MIMO. The method 900 is performed by the eNB 110 illustrated in FIG. 1. Although the operations of method 900 are illustrated as being performed in a particular order, it is understood that the operations of method 900 may be reordered without departing from the scope of the method.

At 905, a first uplink grant for a first UE is generated. The first uplink grant allocating a plurality of RBs to the first UE. At 910, a second uplink grant for a second UE is generated. The second uplink grant allocating a first portion of the RBs in the plurality of RBs to the second UE. At 915, an uplink transmission is obtained from the UE. The uplink transmission having a first DMRS sequence for the first portion of the RBs in the plurality of RBs and having a second DMRS sequence for the second portion of the RBs in the plurality or RBs. The second portion of the RBs in the plurality of RBs are different from the first portion of the RBs in the plurality of RBs. The second DMRS sequence is different from the first DMRS sequence.

The operations of method 900 may be performed by an application specific processor, programmable application specific integrated circuit (ASIC), field programmable gate array (FPGA), or the like.

Figure 10:
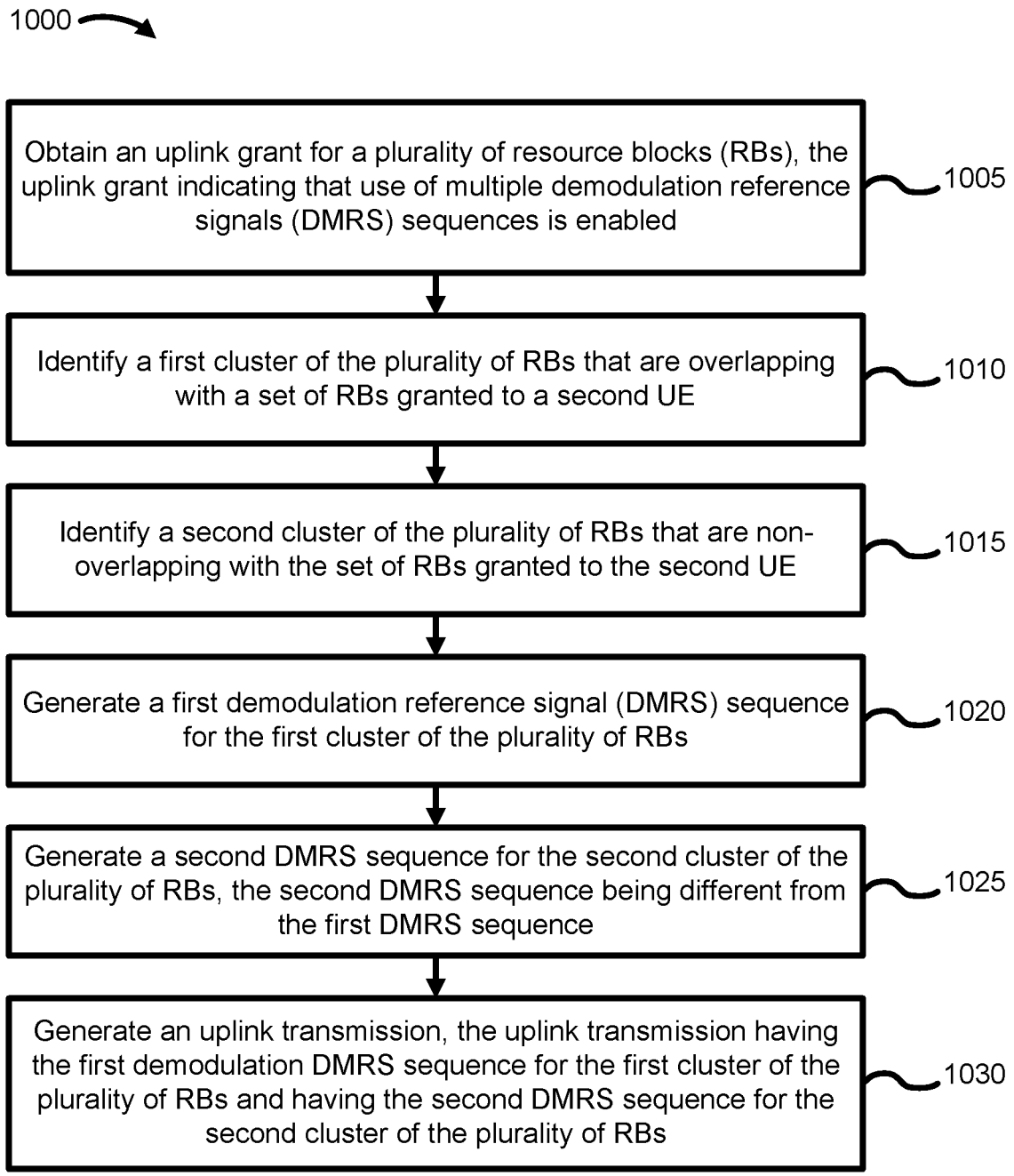
FIG. 10 is a flow diagram of a method for wireless communication by a UE that supports MU-MIMO.

FIG. 10 is a flow diagram of a method 1000 for wireless communication by a UE that supports MU-MIMO. The method 1000 is performed by the UE 105 illustrated in FIG. 1. Although the operations of method 1000 are illustrated as being performed in a particular order, it is understood that the operations of method 1000 may be reordered without departing from the scope of the method.

At 1005, an uplink grant for a plurality of RBs is obtained. The uplink grant indicates that use of multiple DMRS sequences is enabled. At 1010, a first cluster of the plurality of RBs that are overlapping with a set of RBs granted to a second UE is identified. At 1015, a second cluster of the plurality of RBs that are non-overlapping with the set of RBs granted to the second UE is identified. At 1020, a first DMRS sequence is generated for the first cluster of the plurality of RBs. At 1025, a second DMRS sequence is generated for the second cluster of the plurality of RBs. The second DMRS sequence is different from the first DMRS sequence. At 1030, an uplink transmission is generated. The uplink transmission has the first DMRS sequence for the first cluster of the plurality of RBs and has the second DMRS sequence for the second cluster of the plurality of the RBs.

The operations of method 1000 may be performed by an application specific processor, programmable application specific integrated circuit (ASIC), field programmable gate array (FPGA), or the like.

Figure 11:
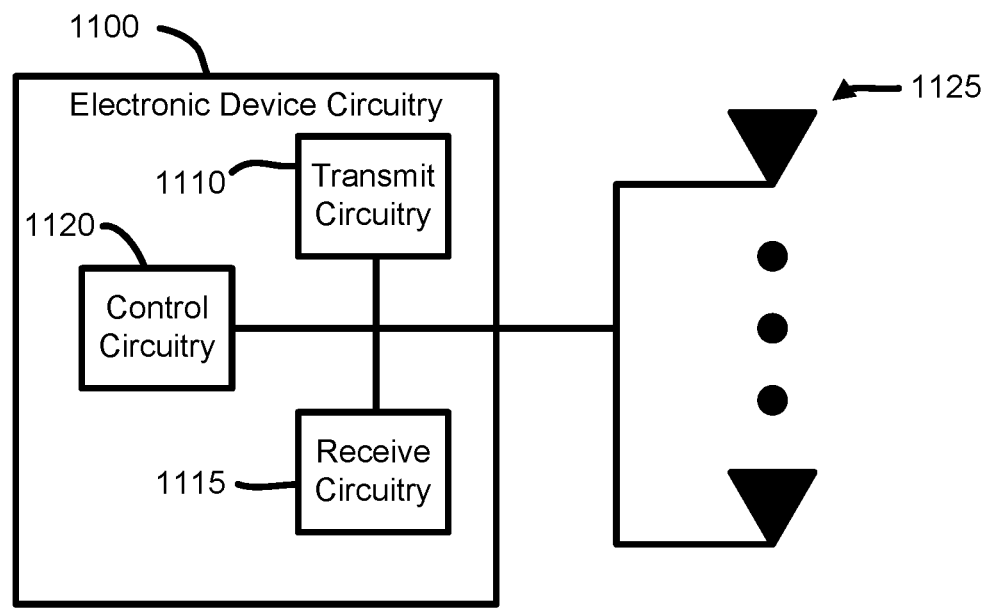
FIG. 11 is a block diagram illustrating electronic device circuitry that may be UE circuitry, network node circuitry, or some other type of circuitry in accordance with various embodiments.

FIG. 11 is a block diagram illustrating electronic device circuitry 1100 that may be UE circuitry, network node circuitry, or some other type of circuitry in accordance with various embodiments. In embodiments, the electronic device circuitry 1100 may be, or may be incorporated into or otherwise a part of a UE (e.g., UE 105), a mobile station (MS), a BTS, a network node, or some other type of electronic device. In embodiments, the electronic device circuitry 1100 may include radio transmit circuitry 1110 and receive circuitry 1115 coupled to control circuitry 1120 (e.g., baseband processor(s)). In embodiments, the transmit circuitry 1110 and/or receive circuitry 1115 may be elements or modules of transceiver circuitry, as shown. In some embodiments, the control circuitry 1120 can be in a device separate from the transmit circuitry 1110 and the receive circuitry 1115 (baseband processors shared by multiple antenna devices, as in cloud-RAN (C-RAN) implementations, for example). The electronic device circuitry 1100 may be coupled with one or more plurality of antenna elements 1125 of one or more antennas. The electronic device circuitry 1100 and/or the components of the electronic device circuitry 1100 may be configured to perform operations similar to those described elsewhere in this disclosure.

In embodiments where the electronic device circuitry 1100 is or is incorporated into or otherwise part of a UE, the transmit circuitry 1110 can transmit the various described information (e.g., DMRS, PUCCH, PUSCH) to the eNB. The receive circuitry 1115 can receive the various described information (e.g., uplink grant) from the eNB. In certain embodiments, the electronic device circuitry 1100 shown in FIG. 11 is operable to perform one or more methods, such as the methods shown in FIGS. 7, 8, and 10.

Figure 12:
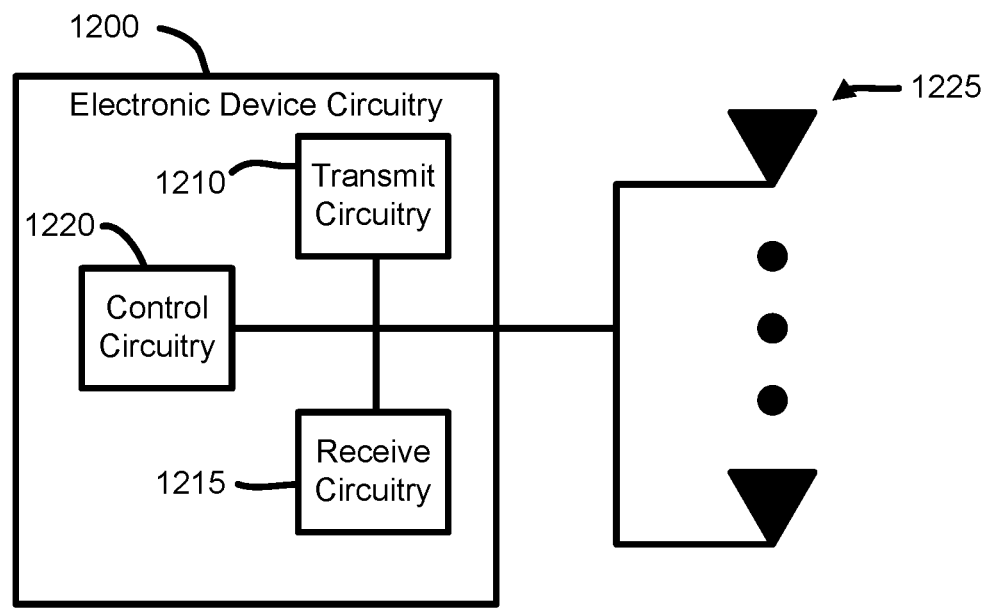
FIG. 12 is a block diagram illustrating electronic device circuitry that may be eNB circuitry, network node circuitry, or some other type of circuitry in accordance with various embodiments.

FIG. 12 is a block diagram illustrating electronic device circuitry 1200 that may be eNB circuitry, network node circuitry, or some other type of circuitry in accordance with various embodiments. In embodiments, the electronic device circuitry 1200 may be, or may be incorporated into or otherwise a part of, an eNB (e.g., eNB 110), a BTS, a network node, or some other type of electronic device. In embodiments, the electronic device circuitry 1200 may include radio transmit circuitry 1210 and receive circuitry 1215 coupled to control circuitry 1220 (e.g., baseband processor(s)). In embodiments, the transmit circuitry 1210 and/or receive circuitry 1215 may be elements or modules of transceiver circuitry, as shown. In some embodiments, the control circuitry 1220 can be in a device separate from the transmit circuitry 1210 and the receive circuitry 1215 (baseband processors shared by multiple antenna devices, as in cloud-RAN (C-RAN) implementations, for example). The electronic device circuitry 1200 may be coupled with one or more plurality of antenna elements 1225 of one or more antennas. The electronic device circuitry 1200 and/or the components of the electronic device circuitry 1200 may be configured to perform operations similar to those described elsewhere in this disclosure.

In embodiments where the electronic device circuitry 1200 is an eNB, BTS and/or a network node, or is incorporated into or is otherwise part of an eNB, BTS and/or a network node, the transmit circuitry 1210 can transmit the various described information (e.g., uplink grant) to the UE. The receive circuitry 1215 can receive the various described information (e.g., DMRS, PUCCH, PUSCH, etc.) from the UE. In certain embodiments, the electronic device circuitry 1200 shown in FIG. 12 is operable to perform one or more methods, such as the methods shown in FIG. 9.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 13:
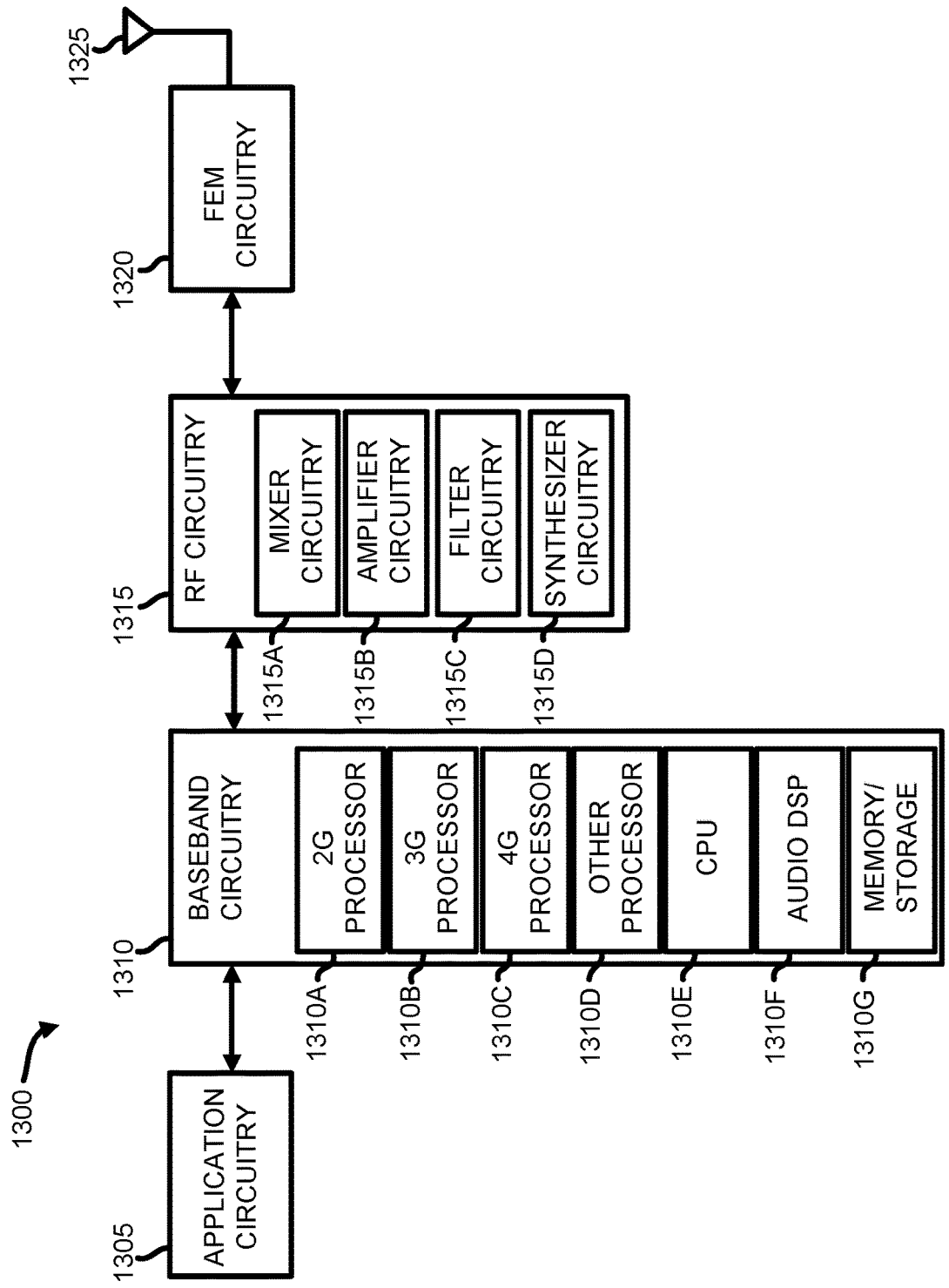
FIG. 13 is a block diagram illustrating, for one embodiment, example components of a user equipment (UE) or mobile station (MS) device.

Embodiments described herein may be implemented into a system using any suitably configured hardware and/or software. FIG. 13 is a block diagram illustrating, for one embodiment, example components of a user equipment (UE) or mobile station (MS) device 1300. In some embodiments, the UE device 1300 may include application circuitry 1305, baseband circuitry 1310, Radio Frequency (RF) circuitry 1315, front-end module (FEM) circuitry 1320, and one or more antennas 1325, coupled together at least as shown in FIG. 13.

The application circuitry 1305 may include one or more application processors. By way of non-limiting example, the application circuitry 1305 may include one or more single-core or multi-core processors. The processor(s) may include any combination of general-purpose processors and dedicated processors (e.g., graphics processors, application processors, etc.). The processor(s) may be operably coupled and/or include memory/storage, and may be configured to execute instructions stored in the memory/storage to enable various applications and/or operating systems to run on the system.

By way of non-limiting example, the baseband circuitry 1310 may include one or more single-core or multi-core processors. The baseband circuitry 1310 may include one or more baseband processors and/or control logic. The baseband circuitry 1310 may be configured to process baseband signals received from a receive signal path of the RF circuitry 1315. The baseband 1310 may also be configured to generate baseband signals for a transmit signal path of the RF circuitry 1306. The baseband processing circuitry 1310 may interface with the application circuitry 1305 for generation and processing of the baseband signals, and for controlling operations of the RF circuitry 1315.

By way of non-limiting example, the baseband circuitry 1310 may include at least one of a second generation (2G) baseband processor 1310A, a third generation (3G) baseband processor 1310B, a fourth generation (4G) baseband processor 1310C, other baseband processor(s) 1310D for other existing generations, and generations in development or to be developed in the future (e.g., fifth generation (5G), 6G, etc.). The baseband circuitry 1310 (e.g., at least one of baseband processors 1310A-1310D) may handle various radio control functions that enable communication with one or more radio networks via the RF circuitry 1315. By way of non-limiting example, the radio control functions may include signal modulation/demodulation, encoding/decoding, radio frequency shifting, other functions, and combinations thereof. In some embodiments, modulation/demodulation circuitry of the baseband circuitry 1310 may be programmed to perform Fast-Fourier Transform (FFT), precoding, constellation mapping/demapping functions, other functions, and combinations thereof. In some embodiments, encoding/decoding circuitry of the baseband circuitry 1310 may be programmed to perform convolutions, tail-biting convolutions, turbo, Viterbi, Low Density Parity Check (LDPC) encoder/decoder functions, other functions, and combinations thereof. Embodiments of modulation/demodulation and encoder/decoder functions are not limited to these examples, and may include other suitable functions.

In some embodiments, the baseband circuitry 1310 may include elements of a protocol stack. By way of non-limiting example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1310E of the baseband circuitry 1310 may be programmed to run elements of the protocol stack for signaling of the PHY, MAC, RLC, PDCP and/or RRC layers. In some embodiments, the baseband circuitry 1310 may include one or more audio digital signal processor(s) (DSP) 1310F. The audio DSP(s) 1310F may include elements for compression/decompression and echo cancellation. The audio DSP(s) 1310F may also include other suitable processing elements.

The baseband circuitry 1310 may further include memory/storage 1310G. The memory/storage 1310G may include data and/or instructions for operations performed by the processors of the baseband circuitry 1310 stored thereon. In some embodiments, the memory/storage 1310G may include any combination of suitable volatile memory and/or non-volatile memory. The memory/storage 1310G may also include any combination of various levels of memory/storage including, but not limited to, read-only memory (ROM) having embedded software instructions (e.g., firmware), random access memory (e.g., dynamic random access memory (DRAM)), cache, buffers, etc. In some embodiments, the memory/storage 1310G may be shared among the various processors or dedicated to particular processors.

Components of the baseband circuitry 1310 may be suitably combined in a single chip, a single chipset, or disposed on a same circuit board in some embodiments. In some embodiments, some or all of the constituent components of the baseband circuitry 1310 and the application circuitry 1305 may be implemented together, such as, for example, on a system on a chip (SOC).

In some embodiments, the baseband circuitry 1310 may provide for communication compatible with one or more radio technologies. For example, in some embodiments, the baseband circuitry 1310 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1310 is configured to support radio communications of more than one wireless protocol may be referred to as multi-mode baseband circuitry.

The RF circuitry 1315 may enable communication with wireless networks using modulated electromagnetic radiation through a non-solid medium. In various embodiments, the RF circuitry 1315 may include switches, filters, amplifiers, etc. to facilitate the communication with the wireless network. The RF circuitry 1315 may include a receive signal path which may include circuitry to down-convert RF signals received from the FEM circuitry 1320, and provide baseband signals to the baseband circuitry 1310. The RF circuitry 1315 may also include a transmit signal path which may include circuitry to up-convert baseband signals provided by the baseband circuitry 1310, and provide RF output signals to the FEM circuitry 1320 for transmission.

In some embodiments, the RF circuitry 1315 may include a receive signal path and a transmit signal path. The receive signal path of the RF circuitry 1315 may include mixer circuitry 1315A, amplifier circuitry 1315B, and filter circuitry 1315C. The transmit signal path of the RF circuitry 1315 may include filter circuitry 1315C and mixer circuitry 1315A. The RF circuitry 1315 may further include synthesizer circuitry 1315D configured to synthesize a frequency for use by the mixer circuitry 1315A of the receive signal path and the transmit signal path. In some embodiments, the mixer circuitry 1315A of the receive signal path may be configured to down-convert RF signals received from the FEM circuitry 1320 based on the synthesized frequency provided by synthesizer circuitry 1315D. The amplifier circuitry 1315B may be configured to amplify the down-converted signals.

The filter circuitry 1315C may include a low-pass filter (LPF) or band-pass filter (BPF) configured to remove unwanted signals from the down-converted signals to generate output baseband signals. Output baseband signals may be provided to the baseband circuitry 1310 for further processing. In some embodiments, the output baseband signals may include zero-frequency baseband signals, although this is not a requirement. In some embodiments, the mixer circuitry 1315A of the receive signal path may comprise passive mixers, although the scope of the embodiments is not limited in this respect.

In some embodiments, the mixer circuitry 1315A of the transmit signal path may be configured to up-convert input baseband signals based on the synthesized frequency provided by the synthesizer circuitry 1315D to generate RF output signals for the FEM circuitry 1320. The baseband signals may be provided by the baseband circuitry 1310 and may be filtered by filter circuitry 1315C. The filter circuitry 1315C may include a low-pass filter (LPF), although the scope of the embodiments is not limited in this respect. In some embodiments, the mixer circuitry 1315A of the receive signal path and the mixer circuitry 1315A of the transmit signal path may include two or more mixers, and may be arranged for quadrature downconversion and/or upconversion, respectively. In some embodiments, the mixer circuitry 1315A of the receive signal path and the mixer circuitry 1315A of the transmit signal path may include two or more mixers and may be arranged for image rejection (e.g., Hartley image rejection). In some embodiments, the mixer circuitry 1315A of the receive signal path and the mixer circuitry 1315A may be arranged for direct downconversion and/or direct upconversion, respectively. In some embodiments, the mixer circuitry 1315A of the receive signal path and the mixer circuitry 1315A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In such embodiments, the RF circuitry 1315 may include analog-to-digital converter (ADC) and digital-to-analog converter (DAC) circuitry, and the baseband circuitry 1310 may include a digital baseband interface to communicate with the RF circuitry 1315.

In some dual-mode embodiments, separate radio IC circuitry may be provided for processing signals for each spectrum, although the scope of the embodiments is not limited in this respect.

In some embodiments, the synthesizer circuitry 1315D may include one or more of a fractional-N synthesizer and a fractional N/N+1 synthesizer, although the scope of the embodiments is not limited in this respect as other types of frequency synthesizers may be suitable. For example, synthesizer circuitry 1315D may include a delta-sigma synthesizer, a frequency multiplier, a synthesizer comprising a phase-locked loop with a frequency divider, other synthesizers, and combinations thereof.

The synthesizer circuitry 1315D may be configured to synthesize an output frequency for use by the mixer circuitry 1315A of the RF circuitry 1315 based on a frequency input and a divider control input. In some embodiments, the synthesizer circuitry 1315D may be a fractional N/N+1 synthesizer.

In some embodiments, frequency input may be provided by a voltage controlled oscillator (VCO), although that is not a requirement. Divider control input may be provided by either the baseband circuitry 1310 or the applications processor 1305 depending on the desired output frequency. In some embodiments, a divider control input (e.g., N) may be determined from a look-up table based on a channel indicated by the applications processor 1305.

The synthesizer circuitry 1315D of the RF circuitry 1315 may include a divider, a delay-locked loop (DLL), a multiplexer and a phase accumulator. In some embodiments, the divider may include a dual modulus divider (DMD), and the phase accumulator may include a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In such embodiments, the delay elements may be configured to break a VCO period up into Nd equal packets of phase, where Nd is the number of delay elements in the delay line. In this way, the DLL may provide negative feedback to help ensure that the total delay through the delay line is one VCO cycle.

In some embodiments, the synthesizer circuitry 1315D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be a LO frequency (fLO). In some embodiments, the RF circuitry 1315 may include an IQ/polar converter.

The FEM circuitry 1320 may include a receive signal path which may include circuitry configured to operate on RF signals received from one or more antennas 1325, amplify the received signals, and provide the amplified versions of the received signals to the RF circuitry 1315 for further processing. The FEM circuitry 1320 may also include a transmit signal path which may include circuitry configured to amplify signals for transmission provided by the RF circuitry 1315 for transmission by at least one of the one or more antennas 1325.

In some embodiments, the FEM circuitry 1320 may include a TX/RX switch configured to switch between a transmit mode and a receive mode operation. The FEM circuitry 1320 may include a receive signal path and a transmit signal path. The receive signal path of the FEM circuitry 1320 may include a low-noise amplifier (LNA) to amplify received RF signals and provide the amplified received RF signals as an output (e.g., to the RF circuitry 1315). The transmit signal path of the FEM circuitry 1320 may include a power amplifier (PA) configured to amplify input RF signals (e.g., provided by RF circuitry 1315), and one or more filters configured to generate RF signals for subsequent transmission (e.g., by one or more of the one or more antennas 1325.

In some embodiments, the MS device 1300 may include additional elements such as, for example, memory/storage, a display, a camera, one of more sensors, an input/output (I/O) interface, other elements, and combinations thereof.

In some embodiments, the MS device 1300 may be configured to perform one or more processes, techniques, and/or methods as described herein, or portions thereof.

EXAMPLES

The following examples pertain to further embodiments.

Example 1 is an apparatus of a user equipment (UE) for wireless communication. The apparatus includes one or more processors. The one or more processors obtain an uplink grant for a plurality of resource blocks (RBs), determine a first portion of the plurality of RBs that are overlapping with a set of RBs granted to a second UE, determine a second portion of the plurality of RBs that are non-overlapping with the set of RBs granted to the second UE, generate a first demodulation reference signal (DMRS) sequence for the first portion of the plurality of RBs, and generate a second DMRS sequence for the second portion of the plurality of RBs, wherein the second DMRS sequence is different from the first DMRS sequence.

In Example 2, the apparatus of Example 1 or any of the Examples described herein can optionally map the first DMRS sequence to a plurality of resource elements in each RB in the first portion of the plurality of RBs.

In Example 3, the apparatus of Example 1 or any of the Examples described herein can optionally map the second DMRS sequence to a plurality of resource elements in each RB in the second portion of the plurality of RBs.

Example 4 is the apparatus of any of Examples 1-3 or any of the Examples described herein where the first DMRS sequence is based on a first root sequence and the second DMRS sequence is based on a second root sequence, wherein the second root sequence is independent from the first root sequence.

Example 5 is the apparatus of Example 1 or any of the Examples described herein where the uplink grant includes an indication of whether the use of multiple DMRS sequences is enabled or disabled.

Example 6 is the apparatus of Example 5 or any of the Examples described herein where the indication is use of resource allocation type 1 when the use of multiple DMRS sequences is enabled and the indication is use of resource allocation type 0 when the use of multiple DMRS sequences is disabled.

Example 7 is the apparatus of Example 1 or any of the Examples described herein where the uplink grant includes at least one of a starting RB and a RB group (RBG) index for the second portion of the plurality of RBs.

Example 8 is the apparatus of any of Examples 1-3 or any of the Examples described herein where the plurality of RBs include a plurality of RBGs, where multiple RBGs in the plurality of RBGs have at least a portion of RBs that are overlapping with a set of RBs granted to another UE.

In Example 9, the apparatus of Example 8 or any of the Examples described herein can optionally generate an independent DMRS sequence for each of the multiple RBGs, wherein the independent DMRS sequences are applied to the at least the portion of the RBs that are overlapping with the set of RBs granted to another UE.

Example 10 is the apparatus of Example 1 or any of the Examples described herein where the first portion of the plurality of RBs are scheduled for multi-user multiple-input multiple-output (MU-MIMO).

Example 11 is the apparatus of Example 1 or any of the Examples described herein where the first portion of the plurality of RBs is a first RB cluster and the second portion of the plurality of RBs is a second RB cluster.

Example 12 is the apparatus of Example 1 or any of the Examples described herein where the one or more processors is a baseband processor.

Example 13 is an apparatus of an evolved Node B (eNB) for wireless communication. The apparatus includes one or more processors. The one or more processors generate a first uplink grant for a first user equipment (UE), the first uplink grant allocating a plurality of resource blocks (RBs) to the first UE, generate a second uplink grant for a second UE, the second uplink grant allocating a first portion of the RBs in the plurality of RBs to the second UE, and obtain an uplink transmission from the first UE, the uplink transmission having a first demodulation reference signal (DMRS) sequence for the first portion of the RBs in the plurality of RBs and having a second DMRS sequence for a second portion of the RBs in the plurality of RBs, the second portion of the RBs in the plurality of RBs being different from the first portion of the RBs in the plurality of RBs, wherein the second DMRS sequence is different from the first DMRS sequence.

Example 14 is the apparatus of Example 13 or any of the Examples described herein where the first DMRS sequence is based on a first root sequence and the second DMRS sequence is based on a second root sequence, wherein the second root sequence is independent from the first root sequence.

Example 15 is the apparatus of Examples 13 or 14, or any of the Examples described herein where the first uplink grant includes an indication of whether the use of multiple DMRS sequences is enabled or disabled.

Example 16 is the apparatus of Example 15 or any of the Examples described herein where the indication is the use of resource allocation type 1 when the use of multiple DMRS sequences is enabled and the indication is the use of resource allocation type 0 when the use of multiple DMRS sequences is disabled.

Example 17 is the apparatus of Example 13 or any of the Examples described herein where the first uplink grant includes at least one of a starting RB and a RB group (RBG) index for the second portion of the plurality of RBs.

Example 18 is the apparatus of Examples 13 or 14, or any of the Examples described herein where the plurality of RBs includes a plurality of RBGs, and where multiple RBGs in the plurality of RBGs have at least a portion of RBs that are overlapping with a set of RBs granted to another UE.

Example 19 is the apparatus of Example 18 or any of the Examples described herein where the uplink transmission has an independent DMRS sequence for each of the multiple RBGs, wherein the independent DMRS sequences are applied to the at least the portion of the RBs that are overlapping with the set of RBs granted to another UE.

Example 20 is the apparatus of Example 13 or any of the Examples described herein where the first DMRS sequence is mapped to a plurality of resource elements in each RB in the first portion of the plurality of RBs.

Example 21 is the apparatus of Example 13 or any of the Examples described herein where the second DMRS sequence is mapped to a plurality of resource elements in each RB in the second portion of the plurality of RBs.

Example 22 is the apparatus of Example 13 or any of the Examples described herein where the first portion of the plurality of RBs are scheduled for multi-user multiple-input multiple-output (MU-MIMO).

Example 23 is the apparatus of Example 13 or any of the Examples described herein where the first portion of the plurality of RBs is a first RB cluster and the second portion of the plurality of RBs is a second RB cluster.

Example 24 is an apparatus of a user equipment (UE). The apparatus includes one or more processors. The one or more processors obtain an uplink grant for a plurality of resource blocks (RBs), the uplink grant indicating that use of multiple demodulation reference signals (DMRS) sequences is enabled, identify a first cluster of the plurality of RBs that are overlapping with a set of RBs granted to a second UE, identify a second cluster of the plurality of RBs that are non-overlapping with the set of RBs granted to the second UE, generate a first demodulation reference signal (DMRS) sequence for the first cluster of the plurality of RBs, generate a second DMRS sequence for the second cluster of the plurality of RBs, the second DMRS sequence being different from the first DMRS sequence, and generate an uplink transmission, the uplink transmission having the first DMRS sequence for the first cluster of the plurality of RBs and having the second DMRS sequence for the second cluster of the plurality of RBs.

Example 25 is the apparatus of Example 24 or any of the Examples described herein where the first DMRS sequence is based on a first Zadoff-Chu root sequence and the second DMRS sequence is based on a second Zadoff-Chu root sequence, wherein the second Zadoff-Chu root sequence is independent from the first Zadoff-Chu root sequence.

Example 26 is the apparatus of Example 24 or any of the Examples described herein where the uplink grant indicates that the use of multiple DMRS sequences is enabled when resource allocation type 1 is used and the uplink grant indicates that the use of multiple DMRS sequences is disabled when resource allocation type 0 is used.

In Example 27, the apparatus of Examples 24 or 25, or any of the Examples described herein can optionally generate an independent DMRS sequence for each RB group (RBG) in a plurality of RBGs in the plurality of RBs where a cluster of the RBs in the RBG overlap with a set of RBs granted to another UE.

Example 28 is a method for wireless communication. The method includes obtaining an uplink grant for a plurality of resource blocks (RBs), determining a first portion of the plurality of RBs that are overlapping with a set of RBs granted to a second UE, determining a second portion of the plurality of RBs that are non-overlapping with the set of RBs granted to the second UE, generating a first demodulation reference signal (DMRS) sequence for the first portion of the plurality of RBs, and generating a second DMRS sequence for the second portion of the plurality of RBs, wherein the second DMRS sequence is different from the first DMRS sequence.

In Example 29, the method of Example 28 or any of the Examples described herein further includes mapping the first DMRS sequence to a plurality of resource elements in each RB in the first portion of the plurality of RBs, and mapping the second DMRS sequence to a plurality of resource elements in each RB in the second portion of the plurality of RBs.

Example 30 is the method of Example 28 or any of the Examples described herein where the first DMRS sequence is based on a first root sequence and the second DMRS sequence is based on a second root sequence, and where the second root sequence is independent from the first root sequence.

Example 31 is the method of Example 28 or any of the Examples described herein where the uplink grant includes an indication of whether the use of multiple DMRS sequences is enabled or disabled.

Example 32 is the method of Example 31 or any of the Examples described herein where the indication is the use of resource allocation type 1 when the use of multiple DMRS sequences is enabled and the indication is the use of resource allocation type 0 when the use of multiple DMRS sequences is disabled.

Example 33 is the method of Example 28 or any of the Examples described herein where the uplink grant includes at least one of a starting RB and a RB group (RBG) index for the second portion of the plurality of RBs.

Example 34 is the method of Example 28 or any of the Examples described herein where the plurality of RBs include a plurality of RBGs, where multiple RBGs in the plurality of RBGs have at least a portion of RBs that are overlapping with a set of RBs granted to another UE.

In Example 35, the method of Example 34 or any of the Examples described herein further includes generating an independent DMRS sequence for each of the multiple RBGs, wherein the independent DMRS sequences are applied to the at least the portion of the RBs that are overlapping with the set of RBs granted to another UE.

Example 36 is the method of Example 28 or any of the Examples described herein where the first portion of the plurality of RBs are scheduled for multi-user multiple-input multiple-output (MU-MIMO).

Example 37 is the method of Example 28 or any of the Examples described herein where the first portion of the plurality of RBs is a first RB cluster and the second portion of the plurality of RBs is a second RB cluster.

Example 38 is a method for wireless communication. The method includes generating a first uplink grant for a first user equipment (UE), the first uplink grant allocating a plurality of resource blocks (RBs) to the first UE, generating a second uplink grant for a second UE, the second uplink grant allocating a first portion of the RBs in the plurality of RBs to the second UE, and obtaining an uplink transmission from the first UE, the uplink transmission having a first demodulation reference signal (DMRS) sequence for the first portion of the RBs in the plurality of RBs and having a second DMRS sequence for a second portion of the RBs in the plurality of RBs, the second portion of the RBs in the plurality of RBs being different from the first portion of the RBs in the plurality of RBs, where the second DMRS sequence is different from the first DMRS sequence.

Example 39 is the method of Example 38 or any of the Examples described herein where the first DMRS sequence is based on a first root sequence and the second DMRS sequence is based on a second root sequence, and where the second root sequence is independent from the first root sequence.

Example 40 is the method of Example 38 or any of the Examples described herein where the first uplink grant includes an indication of whether the use of multiple DMRS sequences is enabled or disabled.

Example 41 is the method of Example 40 or any of the Examples described herein where the indication is the use of resource allocation type 1 when the use of multiple DMRS sequences is enabled and the indication is the use of resource allocation type 0 when the use of multiple DMRS sequences is disabled.

Example 42 is the method of Example 38 or any of the Examples described herein where the first uplink grant includes at least one of a starting RB and a RB group (RBG) index for the second portion of the plurality of RBs.

Example 43 is the method of Example 38 or any of the Examples described herein where the plurality of RBs include a plurality of RBGs, and where multiple RBGs in the plurality of RBGs have at least a portion of RBs that are overlapping with a set of RBs granted to another UE.

Example 44 is the method of Example 43 or any of the Examples described herein where the uplink transmission has an independent DMRS sequence for each of the multiple RBGs, wherein the independent DMRS sequences are applied to the at least the portion of the RBs that are overlapping with the set of RBs granted to another UE.

Example 45 is the method of Example 38 or any of the Examples described herein where the first DMRS sequence is mapped to a plurality of resource elements in each RB in the first portion of the plurality of RBs and the second DMRS sequence is mapped to a plurality of resource elements in each RB in the second portion of the plurality of RBs.

Example 46 is the method of Example 38 or any of the Examples described herein where the first portion of the plurality of RBs are scheduled for multi-user multiple-input multiple-output (MU-MIMO).

Example 47 is the method of Example 38 or any of the Examples described herein where the first portion of the plurality of RBs is a first RB cluster and the second portion of the plurality of RBs is a second RB cluster.

Example 48 is a method for generating DMRS. The method includes obtaining an uplink grant for a plurality of resource blocks (RBs), the uplink grant indicating that use of multiple demodulation reference signals (DMRS) sequences is enabled, identifying a first cluster of the plurality of RBs that are overlapping with a set of RBs granted to a second UE, identifying a second cluster of the plurality of RBs that are non-overlapping with the set of RBs granted to the second UE, generating a first demodulation reference signal (DMRS) sequence for the first cluster of the plurality of RBs, generating a second DMRS sequence for the second cluster of the plurality of RBs, the second DMRS sequence being different from the first DMRS sequence, and generating an uplink transmission, the uplink transmission having the first DMRS sequence for the first cluster of the plurality of RBs and having the second DMRS sequence for the second cluster of the plurality of RBs.

Example 49 is the method of Example 48 or any of the Examples described herein where the first DMRS sequence is based on a first Zadoff-Chu root sequence and the second DMRS sequence is based on a second Zadoff-Chu root sequence, wherein the second Zadoff-Chu root sequence is independent from the first Zadoff-Chu root sequence.

Example 50 is the method of Example 48 or any of the Examples described herein where the uplink grant indicates that the use of multiple DMRS is enabled when resource allocation type 1 is used and the uplink grant indicates that the use of multiple DMRS is disabled when resource allocation type 0 is used.

In Example 51, the method of Example 48 or any of the Examples described herein further includes generating an independent DMRS sequence for each RB group (RBG) in a plurality of RBGs in the plurality of RBs where a cluster of the RBs in the RBG overlap with a set of RBs granted to another UE.

Example 52 is an apparatus for a UE including means for executing any of the operations, methods, or processes described herein.

Example 53 is an apparatus for an eNB including means for executing any of the operations, methods, or processes described herein.

Example 54 is a machine-readable storage medium including machine-readable instructions, that when executed, cause one or more processors to implement any one of the operations, methods, or processes, or realize an apparatus described herein.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a non-transitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the disclosure. One skilled in the relevant art will recognize, however, that the disclosure may be practiced without one or more of the specific details, or with other methods, components, materials, etc. In other instances, well-known structures, materials, or operations are not shown or described in detail to avoid obscuring aspects of the disclosure.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

Those having skill in the art will appreciate that many changes may be made to the details of the above-described embodiments without departing from the underlying principles of the disclosure. The scope of the present disclosure should, therefore, be determined only by the following claims.

The invention claimed is:

1. An apparatus of a user equipment (UE) for wireless communication, the apparatus comprising:
one or more processors configured to:
    obtain an uplink grant for a plurality of resource blocks (RBs);
    determine a first portion of the plurality of RBs that are overlapping with a set of RBs granted to a second UE;
    determine a second portion of the plurality of RBs that are non-overlapping with the set of RBs granted to the second UE;
    generate a first demodulation reference signal (DMRS) sequence for the first portion of the plurality of RBs; and
    generate a second DMRS sequence for the second portion of the plurality of RBs,
        wherein the second DMRS sequence is different from the first DMRS sequence,
        wherein the first DMRS sequence is based on a first root sequence used for the first portion of the plurality of RBs that are overlapping,
        wherein the second DMRS sequence is based on a second root sequence used for the second portion of the plurality of RBs that are non-overlapping, and
        wherein the second root sequence is independent from the first root sequence.

2. The apparatus of claim 1, wherein the one or more processors are further configured to:
    map the first DMRS sequence to a plurality of resource elements in each RB in the first portion of the plurality of RBs; and
    map the second DMRS sequence to a plurality of resource elements in each RB in the second portion of the plurality of RBs.

3. The apparatus of claim 1, wherein the uplink grant comprises an indication of whether the use of multiple DMRS sequences is enabled or disabled, and wherein the indication comprises a resource allocation type 1 when the use of multiple DMRS sequences is enabled and the indication comprises a resource allocation type 0 when the use of multiple DMRS sequences is disabled.

4. The apparatus of claim 1, wherein the uplink grant comprises at least one of a starting RB and a RB group (RBG) index for the second portion of the plurality of RBs.

5. The apparatus of claim 1, wherein the plurality of RBs comprise a plurality of RB groups (RBGs), where multiple RBGs in the plurality of RBGs have at least a portion of RBs that are overlapping with a set of RBs granted to another UE.

6. The apparatus of claim 5, wherein the one or more processors are further configured to:
generate an independent DMRS sequence for each of the multiple RBGs, wherein the independent DMRS sequences are applied to the at least the portion of the RBs that are overlapping with the set of RBs granted to another UE.

7. An apparatus of an evolved Node B (eNB) for wireless communication, the apparatus comprising:
one or more processors configured to:
generate a first uplink grant for a first user equipment (UE), the first uplink grant allocating a plurality of resource blocks (RBs) to the first UE;
generate a second uplink grant for a second UE, the second uplink grant allocating a first portion of the RBs in the plurality of RBs to the second UE; and
obtain an uplink transmission from the first UE, the uplink transmission having a first demodulation reference signal (DMRS) sequence for the first portion of the RBs in the plurality of RBs and having a second DMRS sequence for a second portion of the RBs in the plurality of RBs, the second portion of the RBs in the plurality of RBs being different from the first portion of the RBs in the plurality of RBs,
wherein the second DMRS sequence is different from the first DMRS sequence,
wherein the first DMRS sequence is based on a first root sequence used for the first portion of the plurality of RBs that are overlapping,
wherein the second DMRS sequence is based on a second root sequence used for the second portion of the plurality of RBs that are non-overlapping, and
wherein the second root sequence is independent from the first root sequence.

8. The apparatus of claim 7, wherein the first uplink grant comprises an indication of whether the use of multiple DMRS sequences is enabled or disabled, wherein the indication comprises a resource allocation type 1 when the use of multiple DMRS sequences is enabled and the indication comprises a resource allocation type 0 when the use of multiple DMRS sequences is disabled.

9. The apparatus of claim 7, wherein the first uplink grant comprises at least one of a starting RB and a RB group (RBG) index for the second portion of the plurality of RBs.

10. The apparatus of claim 7, wherein the plurality of RBs comprise a plurality of RB groups (RBGs), where multiple RBGs in the plurality of RBGs have at least a portion of RBs that are overlapping with a set of RBs granted to another UE, wherein the uplink transmission has an independent DMRS sequence for each of the multiple RBGs, and wherein the independent DMRS sequences are applied to the at least the portion of the RBs that are overlapping with the set of RBs granted to another UE.

11. An apparatus of a user equipment (UE), comprising:
one or more processors configured to:
obtain an uplink grant for a plurality of resource blocks (RBs), the uplink grant indicating that use of multiple demodulation reference signals (DMRS) sequences is enabled;
identify a first cluster of the plurality of RBs that are overlapping with a set of RBs granted to a second UE;
identify a second cluster of the plurality of RBs that are non-overlapping with the set of RBs granted to the second UE;
generate a first demodulation reference signal (DMRS) sequence for the first cluster of the plurality of RBs;
generate a second DMRS sequence for the second cluster of the plurality of RBs, the second DMRS sequence being different from the first DMRS sequence; and
generate an uplink transmission, the uplink transmission having the first DMRS sequence for the first cluster of the plurality of RBs and having the second DMRS sequence for the second cluster of the plurality of RBs,
wherein the first DMRS sequence is based on a first Zadoff-Chu root sequence used for the first cluster of the plurality of RBs that are overlapping,
wherein the second DMRS sequence is based on a second Zadoff-Chu root sequence used for the second cluster of the plurality of RBs that are non-overlapping, and
wherein the second Zadoff-Chu root sequence is independent from the first Zadoff-Chu root sequence.

12. The apparatus of claim 11, wherein the uplink grant indicates that the use of multiple DMRS sequences is enabled when resource allocation type 1 is used and the uplink grant indicates that the use of multiple DMRS sequences is disabled when resource allocation type 0 is used.

13. The apparatus of claim 12, wherein the one or more processors are further configured to:
generate an independent DMRS sequence for each RB group (RBG) in a plurality of RBGs in the plurality of RBs where a cluster of the RBs in the RBG overlap with a set of RBs granted to another UE.

14. A method for wireless communication, comprising:
obtaining an uplink grant for a plurality of resource blocks (RBs);
determining a first portion of the plurality of RBs that are overlapping with a set of RBs granted to a second UE;
determining a second portion of the plurality of RBs that are non-overlapping with the set of RBs granted to the second UE;
generating a first demodulation reference signal (DMRS) sequence for the first portion of the plurality of RBs; and
generating a second DMRS sequence for the second portion of the plurality of RBs,
wherein the second DMRS sequence is different from the first DMRS sequence,
wherein the first DMRS sequence is based on a first root sequence used for the first portion of the plurality of RBs that are overlapping,
wherein the second DMRS sequence is based on a second root sequence used for the second portion of the plurality of RBs that are non-overlapping, and
wherein the second root sequence is independent from the first root sequence.

15. The method of claim 14, further comprising:
mapping the first DMRS sequence to a plurality of resource elements in each RB in the first portion of the plurality of RBs; and
mapping the second DMRS sequence to a plurality of resource elements in each RB in the second portion of the plurality of RBs.

16. The method of claim 14, further comprising:
generating an independent DMRS sequence for each RB group (RBG) in the plurality of RBs, wherein the independent DMRS sequences are applied to the portion of the RBs that are overlapping with a set of RBs granted to another UE.

\* \* \* \* \*